(12) United States Patent
Wagner et al.

(10) Patent No.: US 10,400,764 B2
(45) Date of Patent: Sep. 3, 2019

(54) WELL SERVICE VALVE SEAT REMOVAL

(71) Applicant: S.P.M. Flow Control, Inc., Fort Worth, TX (US)

(72) Inventors: Bryan Wagner, Fort Worth, TX (US); Justin R. Cummings, Fort Worth, TX (US); Erica Snider, Fort Worth, TX (US); Alexander Grams, Fort Worth, TX (US); Christopher Buckley, Tomball, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 42 days.

(21) Appl. No.: 15/488,101

(22) Filed: Apr. 14, 2017

(65) Prior Publication Data

US 2017/0298932 A1 Oct. 19, 2017

Related U.S. Application Data

(60) Provisional application No. 62/323,417, filed on Apr. 15, 2016.

(51) Int. Cl.
*F04B 53/22* (2006.01)
*F04B 53/10* (2006.01)
(Continued)

(52) U.S. Cl.
CPC .......... *F04B 53/22* (2013.01); *F04B 53/1087* (2013.01); *F04B 53/162* (2013.01);
(Continued)

(58) Field of Classification Search
CPC ........ F16K 1/38; F16K 15/026; F16K 25/005; F16K 1/42; F04B 53/22; F04B 53/1087; F04B 53/162; F04B 53/1022
(Continued)

(56) References Cited

U.S. PATENT DOCUMENTS 2,406,243 A * 8/1946 Newton ............... F16K 1/38
251/118
3,042,359 A * 7/1962 Bredtschneider ......... F16K 1/42
137/595
(Continued)

FOREIGN PATENT DOCUMENTS

DE 10 2006 061 253 A1 6/2008
GB 937290 2/1961
WO WO-2015/077252 A1 5/2015

OTHER PUBLICATIONS

Canadian Search Report dated Feb. 16, 2018 for Canadian Patent Application No. 2,964,578, 6 pages.
(Continued)

*Primary Examiner* — Umashankar Venkatesan
(74) *Attorney, Agent, or Firm* — Foley & Lardner LLP

(57) ABSTRACT

A valve seat includes a generally cylindrical body that defines a bore extending axially therethrough and has an outer surface. An enlarged diameter portion extends axially from the generally cylindrical body and defines a shoulder surface and an annular surface disposed opposite the shoulder surface; the annular surface is configured to form a seal with a displaceable portion of a valve. An annular notch is formed in the outer surface of the generally cylindrical body, and it extends a distance from a shoulder surface. The annular notch decouples a stiffness of the enlarged diameter portion to thereby increase a radial compressibility of the generally cylindrical body. An annular channel is formed in the outer surface of the generally cylindrical body and is disposed axially below the annular notch. The annular channel is configured to receive a hydraulic fluid to compress radially the generally cylindrical body.

18 Claims, 15 Drawing Sheets

(51) Int. Cl.
*F04B 53/16* (2006.01)
*F16K 1/42* (2006.01)
*F16K 1/38* (2006.01)
*F16K 15/02* (2006.01)
*F16K 25/00* (2006.01)

(52) U.S. Cl.
CPC .................. *F16K 1/38* (2013.01); *F16K 1/42* (2013.01); *F16K 15/026* (2013.01); *F16K 25/005* (2013.01); *Y10T 137/6065* (2015.04)

(58) Field of Classification Search
USPC ................. 137/15.18, 15.19, 315.27, 315.33
See application file for complete search history.

(56) References Cited

U.S. PATENT DOCUMENTS

| | | | | |
|---|---|---|---|---|
| 3,811,801 A | | 5/1974 | Buse et al. | |
| 5,052,435 A | * | 10/1991 | Crudup | F16K 15/063 137/516.29 |
| 5,088,521 A | * | 2/1992 | Johnson | E21B 21/01 137/516.29 |
| 5,193,577 A | * | 3/1993 | de Koning | F04B 53/102 137/516.29 |
| 9,188,122 B1 | * | 11/2015 | Reed | F04B 53/1087 |
| 2010/0140526 A1 | | 6/2010 | Forrest et al. | |
| 2013/0202457 A1 | | 8/2013 | Bayyouk et al. | |
| 2013/0202458 A1 | * | 8/2013 | Byrne | F04B 7/02 417/279 |
| 2014/0271266 A1 | | 9/2014 | Young | |
| 2015/0144826 A1 | * | 5/2015 | Bayyouk | F16K 25/005 251/359 |
| 2015/0260177 A1 | | 9/2015 | Deel et al. | |
| 2016/0215588 A1 | * | 7/2016 | Belshan | F16K 31/12 |
| 2017/0298932 A1 | * | 10/2017 | Wagner | F04B 53/1087 |
| 2017/0342976 A1 | * | 11/2017 | Nagaraja Reddy | E21B 43/16 |

OTHER PUBLICATIONS

International Search Report and Written Opinion of International Patent Application No. PCT/US2018/027605 dated Jun. 28, 2018, 16 pages.

* cited by examiner

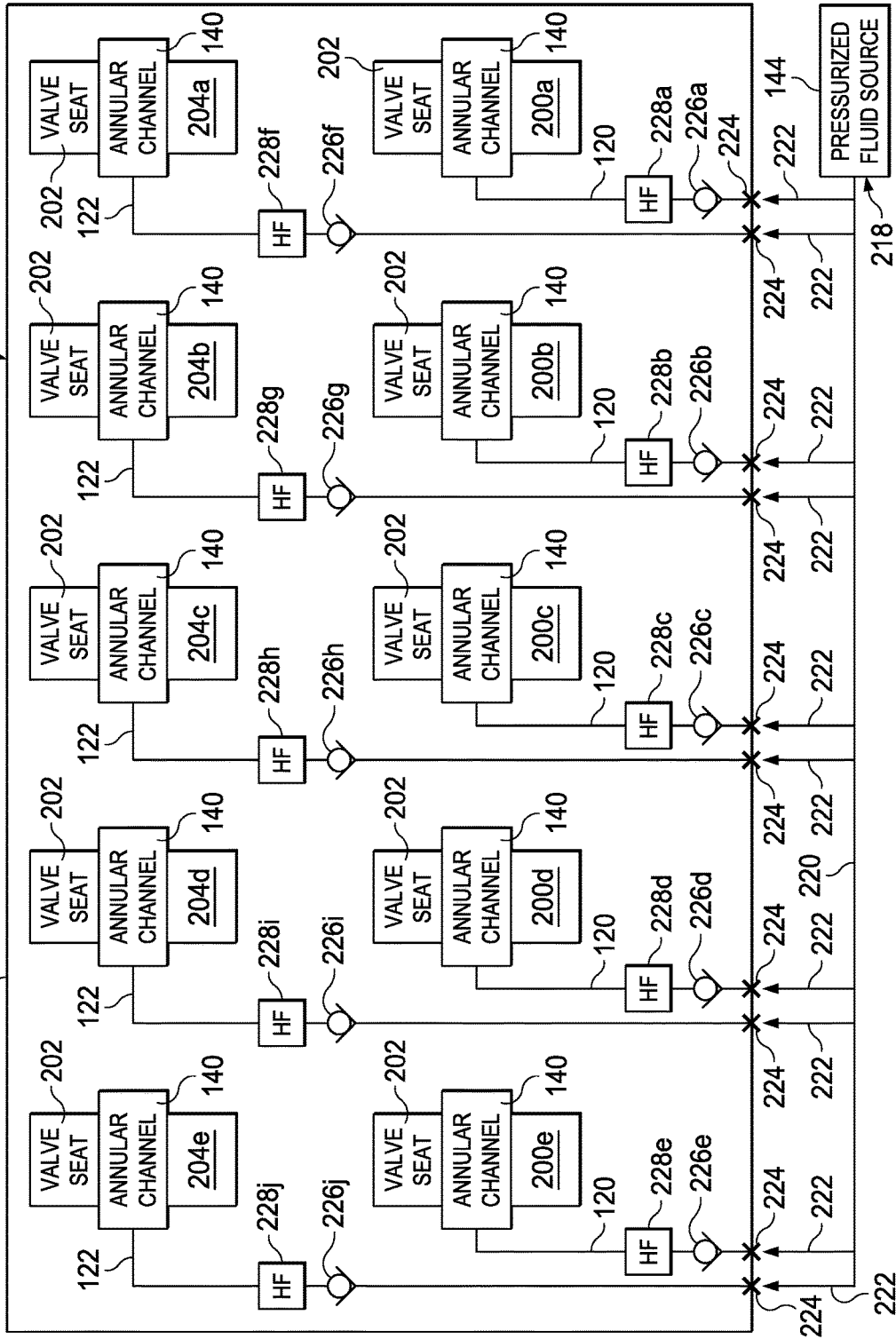

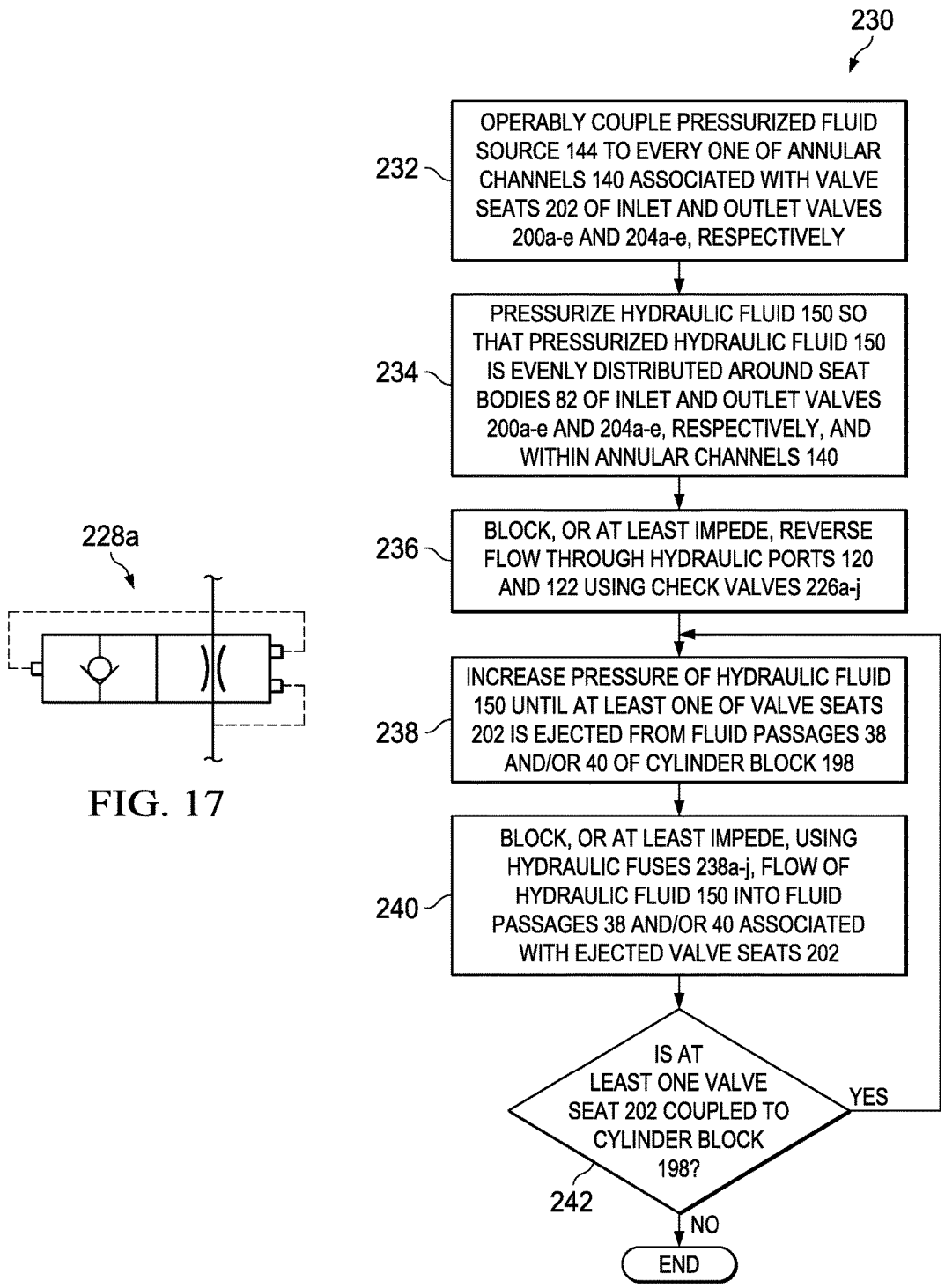

WELL SERVICE VALVE SEAT REMOVAL

CROSS-REFERENCE TO RELATED APPLICATIONS

This application claims priority to U.S. Provisional Patent Application No. 62/323,417, filed on Apr. 15, 2016, the disclosure of which is hereby incorporated by reference.

TECHNICAL FIELD

The present disclosure relates in general to a valve seat in a fluid end of a reciprocating pump assembly and, in particular, to a system and method according to which the valve seat is removed from the fluid end.

BACKGROUND

During a maintenance cycle of a fluid end of a reciprocating pump assembly, one or more used valve seats must be removed from the fluid end. The removal of used valve seats from the fluid end is equipment intensive and time consuming, sometimes requiring hours to remove a single used valve seat. In many cases, the removal of a used valve seat increases the risk of injury to maintenance personnel. Many valve seat removal systems and methods are not capable of meeting efficiency requirements during maintenance cycles. Therefore, what is needed is an apparatus, system, method, or kit that addresses one or more of the foregoing issues, and/or one or more other issues.

SUMMARY

In a first aspect, there is provided a valve seat that includes a generally cylindrical body that defines a bore extending axially therethrough and having an outer surface. An enlarged diameter portion extends axially from the generally cylindrical body and defines a shoulder surface and an annular surface disposed opposite the shoulder surface; the annular surface is configured to form a seal with a displaceable portion of a valve. An annular notch is formed in the outer surface of the generally cylindrical body, and it extends a distance from a shoulder surface. The annular notch decouples a stiffness of the enlarged diameter portion to thereby increase a radial compressibility of the generally cylindrical body. An annular channel is formed in the outer surface of the generally cylindrical body and is disposed axially below the annular notch. The annular channel is configured to receive a hydraulic fluid to compress radially the generally cylindrical body.

In a second aspect, there is provided a reciprocating pump with a fluid end coupled to a power end. The fluid end includes a cylinder block that defines a fluid bore and a plurality of valve seats. At least one of the valve seats includes an enlarged diameter portion extends axially from the generally cylindrical body and defines a shoulder surface and an annular surface disposed opposite the shoulder surface; the annular surface is configured to form a seal with a displaceable portion of a valve. An annular notch is formed in the outer surface of the generally cylindrical body, and it extends a distance from a shoulder surface. The annular notch decouples a stiffness of the enlarged diameter portion to thereby increase a radial compressibility of the generally cylindrical body by a hydraulic fluid injected into an annular channel, where the annular channel is formed in one of the cylinder block and the outer surface of the cylindrical body of the at least one valve seat.

In a third aspect, a method of ejecting a valve seat of a reciprocating pump includes fluidly coupling a source of hydraulic fluid to a fluid bore formed in a cylinder block. The hydraulic fluid is pressurized in the fluid bore and is received by an annular channel and radially compresses the valve seat. The valve seat includes an enlarged diameter portion extends axially from the generally cylindrical body and defines a shoulder surface and an annular surface disposed opposite the shoulder surface; the annular surface is configured to form a seal with a displaceable portion of a valve. An annular notch is formed in the outer surface of the generally cylindrical body, and it extends a distance from a shoulder surface. The annular notch decouples a stiffness of the enlarged diameter portion to thereby increase a radial compressibility of the generally cylindrical body by a hydraulic fluid injected into an annular channel, where the annular channel is formed in one of the cylinder block and the outer surface of the cylindrical body of the at least one valve seat. The valve seat is removed from the cylinder block.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 16 is a diagrammatic view of the system of contemporaneously removing multiple valve seats from the fluid end of FIG. 13, the system including a plurality of check valves and a plurality of hydraulic fuses incorporated into the fluid end, according to an exemplary embodiment.

FIG. 17 is a diagrammatic view of one of the hydraulic fuses of FIG. 16, according to an exemplary embodiment.

FIG. 18 is a flow chart illustration of a method of contemporaneously removing multiple valve seats from the fluid end of FIGS. 16 and 17, according to an exemplary embodiment.

DETAILED DESCRIPTION

Figure 1:
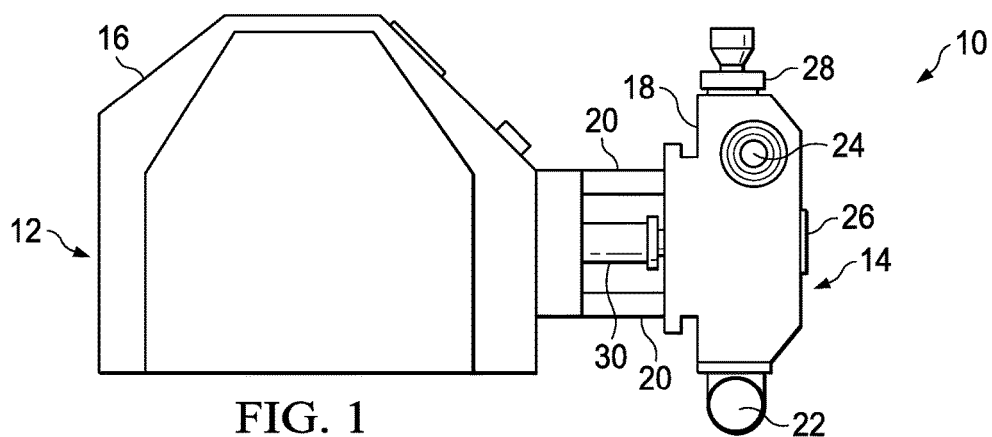
FIG. 1 is an elevational view of a reciprocating pump assembly according to an exemplary embodiment, the reciprocating pump assembly including a fluid end.

In an exemplary embodiment, as illustrated in FIG. 1, a reciprocating pump assembly is schematically illustrated and generally referred to by the reference numeral 10. The reciprocating pump assembly 10 includes a power end 12 and a fluid end 14. The power end 12 includes a housing 16 in which a crankshaft (not shown) is disposed, the crankshaft being operably coupled to an engine or motor (not shown), which is adapted to drive the crankshaft. The fluid end 14 includes a cylinder block 18, which is connected to the housing 16 via a plurality of stay rods 20. The cylinder block 18 includes a suction manifold 22 and a discharge manifold 24, which are spaced in a parallel relation. A plurality of cover assemblies 26, one of which is shown in FIG. 1, are connected to the cylinder block 18 opposite the stay rods 20. A plurality of cover assemblies 28, one of which is shown in FIG. 1, are connected to the cylinder block 18 opposite the suction manifold 22. A plunger rod assembly 30 extends out of the housing 16 and into the cylinder block 18. In several exemplary embodiments, the reciprocating pump assembly 10 is freestanding on the ground, is mounted to a trailer that can be towed between operational sites, or is mounted to a skid.

Figure 2:
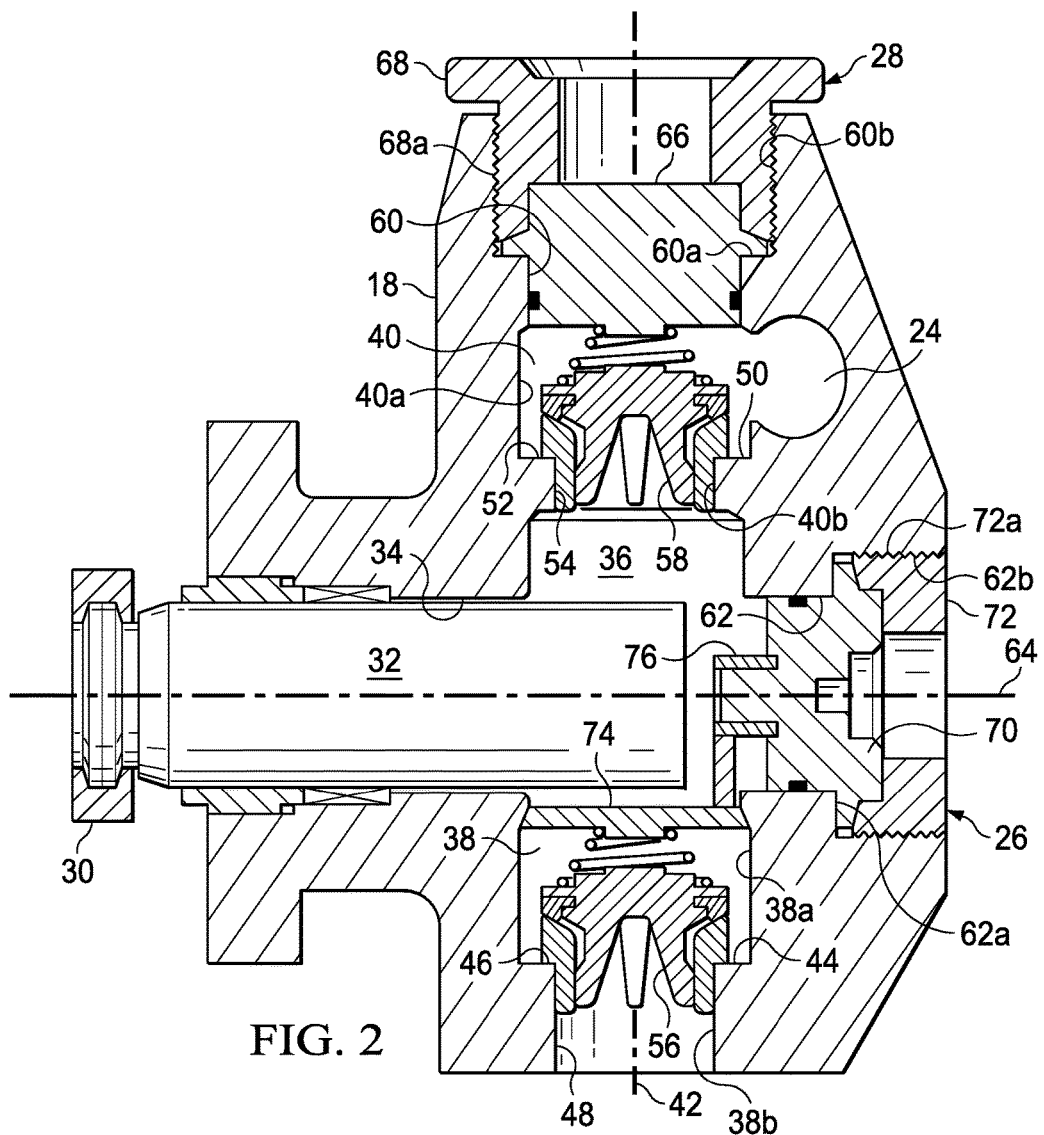
FIG. 2 is a sectional view of the fluid end of FIG. 1 according to an exemplary embodiment.

In an exemplary embodiment, as illustrated in FIG. 2 with continuing reference to FIG. 1, the plunger rod assembly 30 includes a plunger 32, which extends through a bore 34 formed in the cylinder block 18, and into a pressure chamber 36 formed in the cylinder block 18. In several exemplary embodiments, a plurality of parallel-spaced bores may be formed in the cylinder block 18, with one of the bores being the bore 34, a plurality of pressure chambers may be formed in the cylinder block 18, with one of the pressure chambers being the pressure chamber 36, and a plurality of parallel-spaced plungers may extend through respective ones of the bores and into respective ones of the pressure chambers, with one of the plungers being the plunger 32. At least the bore 34, the pressure chamber 36, and the plunger 32 together may be characterized as a plunger throw. In several exemplary embodiments, the reciprocating pump assembly 10 includes five plunger throws (i.e., a quintuplex pump assembly). However, the reciprocating pump assembly 10 may include any number of plunger throws such as, for example, one plunger throw, two plunger throws (i.e., a duplex pump assembly), three plunger throws (i.e., a triplex pump assembly), four plunger throws (i.e., a quadriplex pump assembly), or more.

As shown in FIG. 2, the cylinder block 18 includes inlet and outlet fluid passages 38 and 40, respectively, formed therein. The fluid passages 38 and 40 are generally coaxial along a fluid passage axis 42. Under conditions to be described below, fluid is adapted to flow through the inlet and outlet fluid passages 38 and 40 and along the fluid passage axis 42. The suction manifold 22 is in fluid communication with the pressure chamber 36 via the inlet fluid passage 38. The pressure chamber 36 is in fluid communication with the discharge manifold 24 via the outlet fluid passage 40. The fluid inlet passage 38 includes an enlarged-diameter portion 38a and a reduced-diameter portion 38b extending downward therefrom. The enlarged-diameter portion 38a defines an internal shoulder 44 and thus an annular surface 46 of the cylinder block 18. In several exemplary embodiments, the internal shoulder 44 is tapered so that the annular surface 46 defines a frusto-conical shape (not shown in FIG. 2). The reduced-diameter portion 38b defines an inside surface 48 of the cylinder block 18. Similarly, the fluid outlet passage 40 includes an enlarged-diameter portion 40a and a reduced-diameter portion 40b extending downward therefrom. The enlarged-diameter portion 40a defines an internal shoulder 50 and thus an annular surface 52 of the cylinder block 18. In several exemplary embodiments, the internal shoulder 50 is tapered so that the annular surface 52 defines a frusto-conical shape (not shown in FIG. 2). The reduced-diameter portion 40b defines an inside surface 54 of the cylinder block 18.

An inlet valve 56 is disposed in the fluid passage 38, and engages at least the annular surface 46 and the inside surface 48. Similarly, an outlet valve 58 is disposed in the fluid passage 40, and engages at least the annular surface 52 and the inside surface 54. In an exemplary embodiment, each of the valves 56 and 58 is a spring-loaded valve that is actuated by a predetermined pressure differential thereacross.

A counterbore 60 is formed in the cylinder block 18, and is generally coaxial with the fluid passage axis 42. The counterbore 60 defines an internal shoulder 60a and includes an internal threaded connection 60b adjacent the internal shoulder 60a. A counterbore 62 is formed in the cylinder block 18, and is generally coaxial with the bore 34 along an axis 64. The counterbore 62 defines an internal shoulder 62a and includes an internal threaded connection 62b adjacent the internal shoulder 62a. In several exemplary embodiments, the cylinder block 18 may include a plurality of parallel-spaced counterbores, one of which may be the counterbore 60, with the quantity of counterbores equaling the quantity of plunger throws included in the reciprocating pump assembly 10. Similarly, in several exemplary embodiments, the cylinder block 18 may include another plurality of parallel-spaced counterbores, one of which may be the counterbore 62, with the quantity of counterbores equaling the quantity of plunger throws included in the reciprocating pump assembly 10.

A plug 66 is disposed in the counterbore 60, engaging the internal shoulder 60a and sealingly engaging an inside cylindrical surface defined by the reduced-diameter portion of the counterbore 60. An external threaded connection 68a of a fastener 68 is threadably engaged with the internal threaded connection 60b of the counterbore 60 so that an end portion of the fastener 68 engages the plug 66. As a result, the fastener 68 sets or holds the plug 66 in place against the internal shoulder 60a defined by the counterbore 60, thereby maintaining the sealing engagement of the plug 66 against the inside cylindrical surface defined by the reduced-diameter portion of the counterbore 60. The cover assembly 28 shown in FIGS. 1 and 2 includes at least the plug 66 and the fastener 68. In an exemplary embodiment, the cover assembly 28 may be disconnected from the cylinder block 18 to provide access to, for example, the counterbore 60, the pressure chamber 36, the plunger 32, the fluid passage 40 or the outlet valve 58. The cover assembly 28 may then be reconnected to the cylinder block 18 in accordance with the foregoing. In several exemplary embodiments, the reciprocating pump assembly 10 may include a plurality of plugs, one of which is the plug 66, and a plurality of fasteners, one of which is the fastener 68, with the respective quantities of plugs and fasteners equaling the quantity of plunger throws included in the reciprocating pump assembly 10.

A plug 70 is disposed in the counterbore 62, engaging the internal shoulder 62a and sealingly engaging an inside cylindrical surface defined by the reduced-diameter portion of the counterbore 62. In an exemplary embodiment, the plug 70 may be characterized as a suction cover. An external threaded connection 72a of a fastener 72 is threadably engaged with the internal threaded connection 62b of the counterbore 62 so that an end portion of the fastener 72 engages the plug 70. As a result, the fastener 72 sets or holds the plug 70 in place against the internal shoulder 62a defined by the counterbore 62, thereby maintaining the sealing engagement of the plug 70 against the inside cylindrical surface defined by the reduced-diameter portion of the counterbore 62. The cover assembly 26 shown in FIGS. 1 and 2 includes at least the plug 70 and the fastener 72. In an exemplary embodiment, the cover assembly 26 may be disconnected from the cylinder block 18 to provide access to, for example, the counterbore 62, the pressure chamber 36, the plunger 32, the fluid passage 38, or the inlet valve 56. The cover assembly 26 may then be reconnected to the cylinder block 18 in accordance with the foregoing. In several exemplary embodiments, the reciprocating pump assembly 10 may include another plurality of plugs, one of which is the plug 70, and another plurality of fasteners, one of which is the fastener 72, with the respective quantities of plugs and fasteners equaling the quantity of plunger throws included in the reciprocating pump assembly 10.

A valve spring retainer 74 is disposed in the enlarged-diameter portion 38a of the fluid passage 38. The valve spring retainer 74 is connected to the end portion of the plug 70 opposite the fastener 72. In an exemplary embodiment, and as shown in FIG. 2, the valve spring retainer 74 is connected to the plug 70 via a hub 76, which is generally coaxial with the axis 64.

Figure 3:
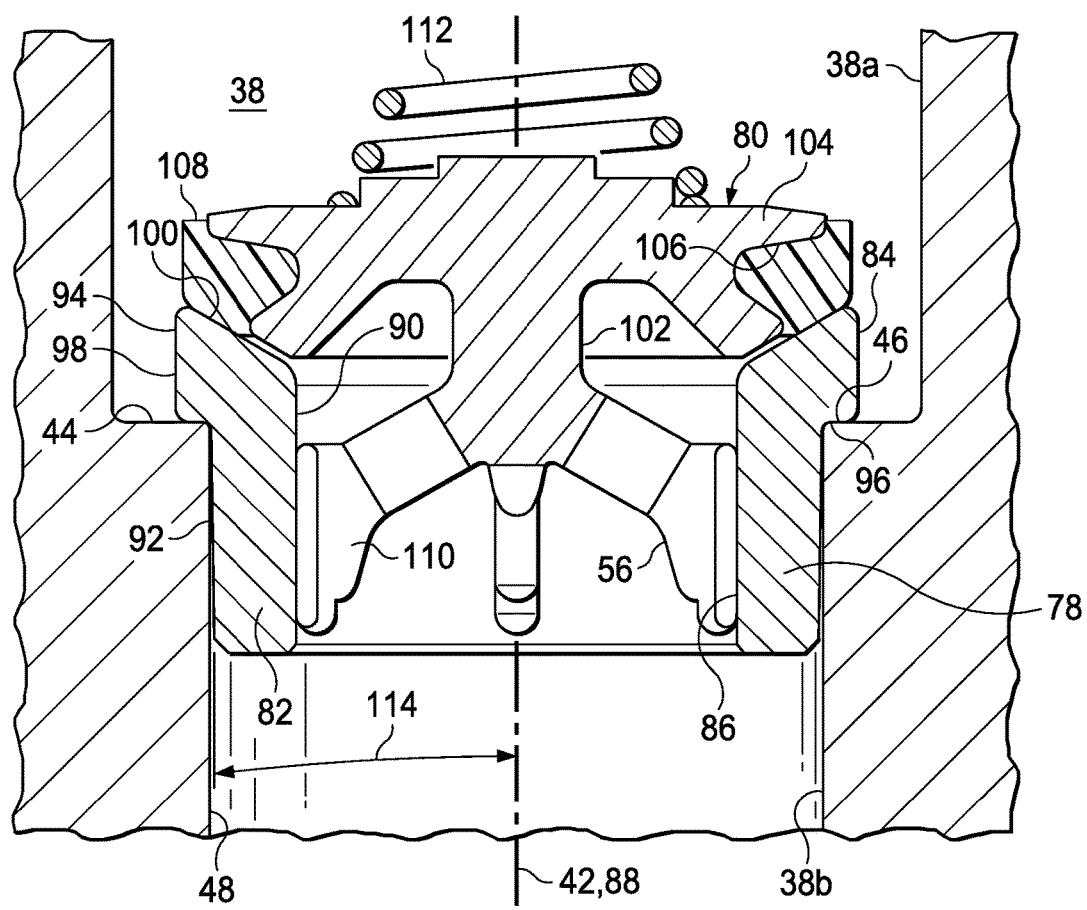
FIG. 3 is an enlarged view of a portion of the sectional view of FIG. 2, according to an exemplary embodiment.

In an exemplary embodiment, as illustrated in FIG. 3 with continuing reference to FIGS. 1 and 2, the inlet valve 56 includes a valve seat 78 and a valve member 80 engaged therewith. The valve seat 78 includes a seat body 82 having an enlarged-diameter portion 84 at one end thereof. The enlarged-diameter portion 84 of the seat body 82 is disposed in the enlarged-diameter portion 38a of the fluid passage 38. A bore 86 is formed through the seat body 82. The valve seat 78 has a valve seat axis 88, which is aligned with the fluid passage axis 42 when the inlet valve 56 is disposed in the fluid passage 38, as shown in FIG. 3. Under conditions to be described below, fluid flows through the bore 86 and along the valve seat axis 88. The bore 86 defines an inside surface 90 of the seat body 82. An outside surface 92 of the seat body 82 contacts the inside surface 48 defined by the fluid passage 38. In several exemplary embodiments, the outside surface 92 of the seat body 82 sealingly engages the inside surface 48 defined by the fluid passage 38. In several exemplary embodiments, a sealing element (not shown), such as an O-ring, is disposed in an annular groove (not shown) formed in the outside surface 92; the O-ring sealingly engages the inside surface 48.

The enlarged-diameter portion 84 includes an external shoulder 94 and thus defines an annular surface 96. In several exemplary embodiments, at least a portion of the external shoulder 94 is tapered so that the annular surface 96 defines a frusto-conical shape (not shown in FIG. 3), which extends angularly upward from the outside surface 92. The enlarged-diameter portion 84 defines a cylindrical surface 98, which extends axially upward from the extent of the annular surface 96. The annular surface 96 is radially disposed between the outside surface 92 and the cylindrical surface 98. The enlarged-diameter portion 84 further defines a tapered surface 100, which extends angularly upward from the inside surface 90. In an exemplary embodiment, the tapered surface 100 extends at an angle from the valve seat axis 88. The seat body 82 of the valve seat 78 is disposed within the reduced-diameter portion 38b of the fluid passage 38 so that the outside surface 92 of the seat body 82 engages the inside surface 48 of the cylinder block 18. In an exemplary embodiment, the seat body 82 forms an interference fit, or is press fit, in the reduced-diameter portion 38b of the fluid passage 38 so that the valve seat 78 is prevented from being dislodged from the fluid passage 38.

The valve member 80 includes a central stem 102, from which a valve body 104 extends radially outward. An outside annular cavity 106 is formed in the valve body 104. A seal 108 extends within the cavity 106, and is adapted to sealingly engage the tapered surface 100 of the valve seat 78, under conditions to be described below. A plurality of circumferentially-spaced legs 110 extend angularly downward from the central stem 102, and slidably engage the inside surface 90 of the seat body 82. In several exemplary embodiments, the plurality of legs 110 may include two, three, four, five, or greater than five, legs 110. A lower end portion of a spring 112 is engaged with the top of the valve body 104 opposite the central stem 102. The valve member 80 is movable, relative to the valve seat 78 and thus the cylinder block 18, between a closed position (shown in FIG. 3) and an open position (not shown), under conditions to be described below.

In an exemplary embodiment, the seal 108 is molded in place in the valve body 104. In an exemplary embodiment, the seal 108 is preformed and then attached to the valve body 104. In several exemplary embodiments, the seal 108 is composed of one or more materials such as, for example, a deformable thermoplastic material, a urethane material, a fiber-reinforced material, carbon, glass, cotton, wire fibers, cloth, and/or any combination thereof. In an exemplary embodiment, the seal 108 is composed of a cloth which is disposed in a thermoplastic material, and the cloth may include carbon, glass, wire, cotton fibers, and/or any combination thereof. In several exemplary embodiments, the seal 108 is composed of at least a fiber-reinforced material, which can prevent or at least reduce delamination. In an exemplary embodiment, the seal 108 has a hardness of 95 A durometer or greater, or a hardness of 69 D durometer or greater. In several exemplary embodiments, the valve body 104 is much harder and more rigid than the seal 108.

In an exemplary embodiment, with continuing reference to FIG. 3, at least the end portion of the seat body 82 opposite the enlarged-diameter portion 84 is tapered at a taper angle 114 from the fluid passage axis 42 and the valve seat axis 88 aligned therewith. In an exemplary embodiment, instead of, or in addition to the end portion of the seat body 82 opposite the enlarged-diameter portion 84 being tapered, the inside surface 48 of the cylinder block 18 is tapered at the taper angle 114. In several exemplary embodiments, both the end portion of the seat body 82 opposite the enlarged-diameter portion 84 and the inside surface 48 of the cylinder block 18 are tapered at the taper angle 114. In an exemplary embodiment, an interference fit may be formed between the seat body 82 and the inside surface 48, thereby holding the valve seat 78 in place in the cylinder block 18. In several exemplary embodiments, instead of using an interference fit in the fluid passage 38, a threaded connection, a threaded nut, and/or a snap-fit mechanism may be used to hold the valve seat 78 in place in the cylinder block 18.

The outlet valve 58 is identical to the inlet valve 56 and therefore will not be described in further detail. Accordingly, features of the outlet valve 58 that are identical to corresponding features of the inlet valve 56 will be given the same reference numerals as that of the inlet valve 56. The valve seat axis 88 of the outlet valve 58 is aligned with each of the fluid passage axis 42 and the valve seat axis 88 of the inlet valve 56. The outlet valve 58 is disposed in the fluid passage 40, and engages the cylinder block 18, in a manner that is identical to the manner in which the inlet valve 56 is disposed in the fluid passage 38, and engages the cylinder block 18, with the exception that the upper portion of the spring 112 of the outlet valve 58 is compressed against the bottom of the plug 66, rather than being compressed against a component that corresponds to the valve spring retainer 74, against which the upper portion of the spring 112 of the inlet valve 56 is compressed.

In operation, in an exemplary embodiment, with continuing reference to FIGS. 1-3, the plunger 32 reciprocates within the bore 34, reciprocating in and out of the pressure chamber 36. That is, the plunger 32 moves back and forth horizontally, as viewed in FIG. 2, away from and towards the fluid passage axis 42. In an exemplary embodiment, the engine or motor (not shown) drives the crankshaft (not shown) enclosed within the housing 16, thereby causing the plunger 32 to reciprocate within the bore 34 and thus in and out of the pressure chamber 36.

As the plunger 32 reciprocates out of the pressure chamber 36, the inlet valve 56 is opened. More particularly, as the plunger 32 moves away from the fluid passage axis 42, the pressure inside the pressure chamber 36 decreases, creating a pressure differential across the inlet valve 56 and causing the valve member 80 to move upward, as viewed in FIGS. 2 and 3, relative to the valve seat 78 and the cylinder block 18. As a result of the upward movement of the valve member 80, the spring 112 is compressed between the valve body 104 and the valve spring retainer 74, the seal 108 disengages from the tapered surface 100, and the inlet valve 56 is thus placed in its open position. Fluid in the suction manifold 22 flows along the fluid passage axis 42 and through the fluid passage 38 and the inlet valve 56, being drawn into the pressure chamber 36. To flow through the inlet valve 56, the fluid flows through the bore 86 of the valve seat 78 and along the valve seat axis 88. During the fluid flow through the inlet valve 56 and into the pressure chamber 36, the outlet valve 58 is in its closed position, with the seal 108 of the valve member 80 of the outlet valve 58 engaging the tapered surface 100 of the valve seat 78 of the outlet valve 58. Fluid continues to be drawn into the pressure chamber 36 until the plunger 32 is at the end of its stroke away from the fluid passage axis 42. At this point, the pressure differential across the inlet valve 56 is such that the spring 112 of the inlet valve 56 is not further compressed, or begins to decompress and extend, forcing the valve member 80 of the inlet valve 56 to move downward, as viewed in FIGS. 2 and 3, relative to the valve seat 78 and the cylinder block 18. As a result, the inlet valve 56 is placed in, or begins to be placed in, its closed position, with the seal 108 sealingly engaging, or at least moving towards, the tapered surface 100.

As the plunger 32 moves into the pressure chamber 36 and thus towards the fluid passage axis 42, the pressure within the pressure chamber 36 begins to increase. The pressure within the pressure chamber 36 continues to increase until the pressure differential across the outlet valve 58 exceeds a predetermined set point, at which point the outlet valve 58 opens and permits fluid to flow out of the pressure chamber 36, along the fluid passage axis 42, through the fluid passage 40 and the outlet valve 58, and into the discharge manifold 24. As the plunger 32 reaches the end of its stroke towards the fluid passage axis 42 (i.e., its discharge stroke), the inlet valve 56 is in, or is placed in, its closed position, with the seal 108 sealingly engaging the tapered surface 100.

The foregoing is repeated, with the reciprocating pump assembly 10 pressurizing the fluid as the fluid flows from the suction manifold 22 and to the discharge manifold 24 via the pressure chamber 36. In an exemplary embodiment, the reciprocating pump assembly 10 is a single-acting reciprocating pump, with fluid being pumped across only one side of the plunger 32.

In an exemplary embodiment, during the above-described operation of the reciprocating pump assembly 10, the surface 96 abuts the surface 46. The surfaces 46 and 96 provide load balancing, with loading on the enlarged-diameter portion 84 of the valve seat 78 being distributed and transferred to the surface 48 of the cylinder block 18, via either the pressing of the surface 96 against the surface 48 or intermediate material(s) disposed therebetween. In an exemplary embodiment, the loading is distributed across the annular surfaces 46 and 96, reducing stress concentrations. In an exemplary embodiment, the stresses in the valve seat 78, in the vicinity of the interface between the surfaces 92 and 96, are balanced with the stresses in the cylinder block 18, in the vicinity of the interface between the surfaces 48 and 46. As a result, these stresses are reduced. Alternatively, a gap or region may be defined between the surfaces 46 and 96. Material may be disposed in the gap or region between the surfaces 46 and 96 to absorb, transfer and/or distribute loads between the annular surfaces 46 and 96.

In several exemplary embodiments, during the above-described operation of the reciprocating pump assembly 10 using the inlet valve 56, downwardly directed axial loads along the fluid passage axis 42 are applied against the top of the valve body 104. This loading is usually greatest as the plunger 32 moves towards the fluid passage axis 42 and the outlet valve 58 opens and permits fluid to flow out of the pressure chamber 36, through the fluid passage 40 and the outlet valve 58, and into the discharge manifold 24. As the plunger 32 reaches the end of its stroke towards the fluid passage axis 42 (its discharge stroke), the inlet valve 56 is in, or is placed in, its closed position, and the loading applied to the top of the valve body 104 is transferred to the seal 108 via the valve body 104. The loading is then transferred to the valve seat 78 via the seal 108, and then is distributed and transferred to the internal shoulder 44 of the cylinder block 18 via either the engagement of the surface 96 against the surface 48 or intermediate material(s) disposed therebetween. In an exemplary embodiment, the surfaces 46 and 96 facilitate this distribution and transfer of the downwardly directed axial loading to the cylinder block 18 in a balanced manner, thereby reducing stress concentrations in the cylinder block 18 and the valve seat 78.

Figure 4:
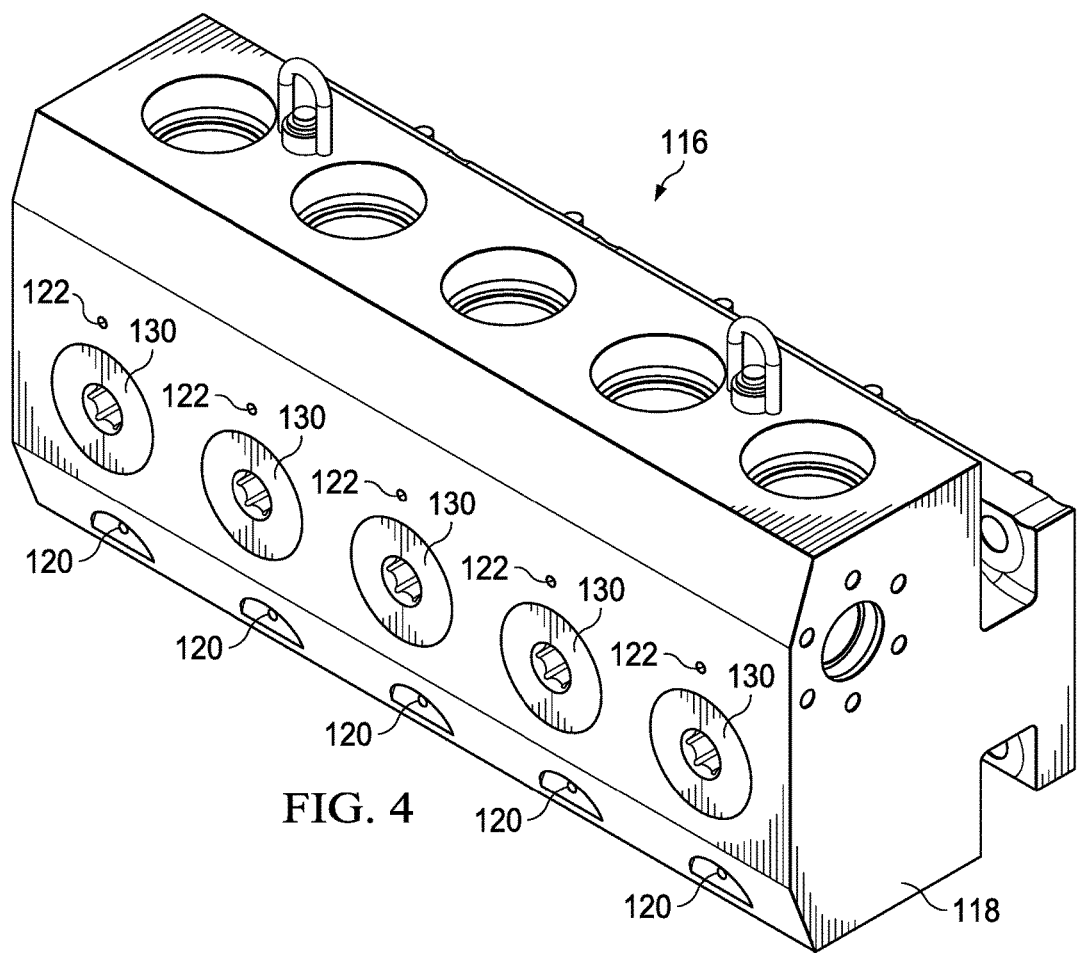
FIG. 4 is a perspective view of a fluid end according to an exemplary embodiment.
Figure 5:
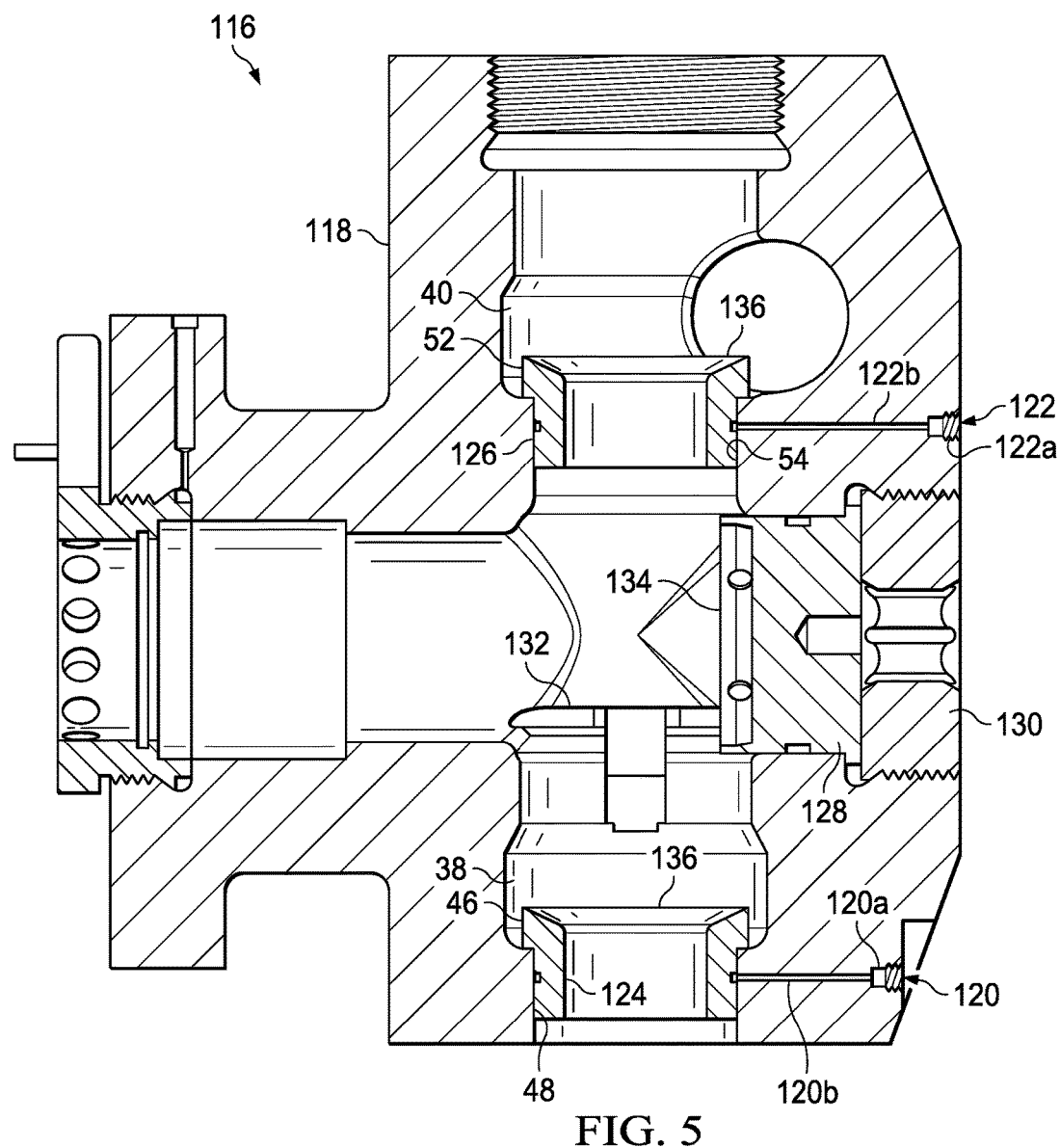
FIG. 5 is a sectional view of the fluid end of FIG. 4, according to an exemplary embodiment.

In an exemplary embodiment, as illustrated in FIGS. 4 and 5 with continuing reference to FIGS. 1-3, a fluid end is generally referred to by the reference numeral 116 and includes several parts that are identical to corresponding parts of the fluid end 14, which identical parts are given the same reference numerals. The fluid end 116 includes a cylinder block 118, rather than the cylinder block 18. The cylinder block 118 includes several features that are identical to corresponding features of the cylinder block 18, which identical features are given the same reference numerals. The cylinder block 118 includes a plurality of linearly-aligned and horizontally-spaced hydraulic ports 120, and a plurality of linearly-aligned and horizontally-spaced hydraulic ports 122. The hydraulic ports 122 are spaced in a parallel relation from the hydraulic ports 120. The respective quantities of the hydraulic ports 120 and 122 equal the quantity of plunger throws included in the reciprocating pump assembly 10. As shown in FIG. 5, each of the hydraulic ports 120 includes an internal threaded connection 120a at or near the exterior of the cylinder block 118, and a fluid bore 120b formed in the cylinder block 118 and extending from the internal threaded connection 120a. The fluid bore 120b intersects the reduced-diameter portion 38b of the fluid inlet passage 38. Similarly, each of the hydraulic ports 122 includes an internal threaded connection 122a at or near the exterior of the cylinder block 118, and a fluid bore 122b formed in the cylinder block 118 and extending from the internal threaded connection 122a. The fluid bore 122b intersects the reduced-diameter portion 40b of the fluid outlet passage 40.

Further, the fluid end 116 includes inlet and outlet valves 124 and 126, respectively, rather than the inlet and outlet valves 56 and 58. The inlet and outlet valves 124 and 126, respectively, include several parts that are identical to corresponding parts of the inlet and outlet valves 56 and 58, which identical parts are given the same reference numerals. The inlet valve 124 is disposed in the fluid passage 38, and engages at least the annular surface 46 and the inside surface 48 of the cylinder block 118. Similarly, the outlet valve 126 is disposed in the fluid passage 40, and engages at least the annular surface 52 and the inside surface 54 of the cylinder block 118. In an exemplary embodiment, each of the inlet and outlet valves 124 and 126, respectively, is a spring-loaded valve that is actuated by a predetermined pressure differential thereacross. The respective valve members 80 of the inlet and outlet valves 124 and 126 are omitted from the figures.

Further still, the fluid end 116 includes a plug 128 and a fastener 130, rather than the plug 70 and the fastener 72. The plug 128 and the fastener 130 include several features that are identical to corresponding features of the plug 70 and the fastener 72, respectively, which identical features are given the same reference numerals. Similarly, the fluid end 116 includes another plug (not shown) and another fastener (not shown), rather than the plug 66 and the fastener 68, the another plug and the another fastener including several features that are identical to corresponding features of the plug 66 and the fastener 68, respectively.

Finally, the fluid end 116 includes a valve spring retainer 132, rather than the valve spring retainer 74. The valve spring retainer 132 is connected to the end portion of the plug 128 opposite the fastener 130. In an exemplary embodiment, the plug 128 includes a hub 134, rather than the hub 76, via which the valve spring retainer 132 is connected to the plug 128.

The fluid end 116 is shown partially assembled in FIG. 5, including the cylinder block 118, the inlet valve 124, the outlet valve 126, the plug 128, the fastener 130, the valve spring retainer 132, and the hub 134. Several parts of the fluid end 116 are omitted from view in FIG. 5 to more clearly show the cylinder block 118, including the another plug, the another fastener, and the plunger rod assembly 30 (including the plunger 32).

Figure 6:
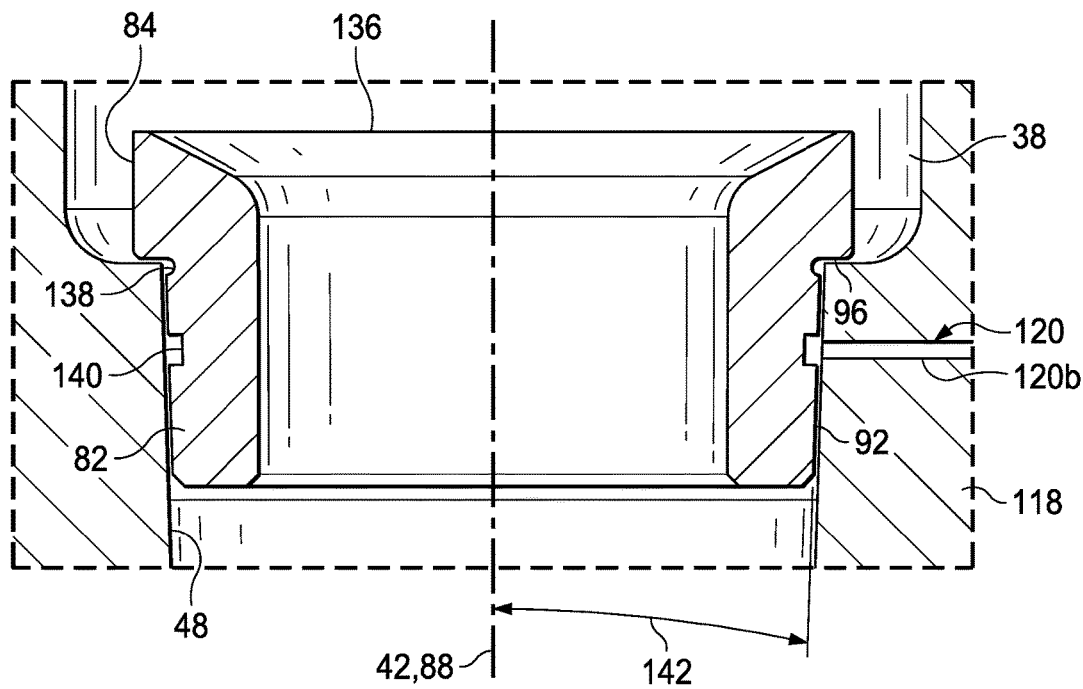
FIG. 6 is an enlarged view of a portion of the sectional view of FIG. 5 according to an exemplary embodiment, the portion including an annular channel formed in an outside surface of a valve seat.
Figure 7:
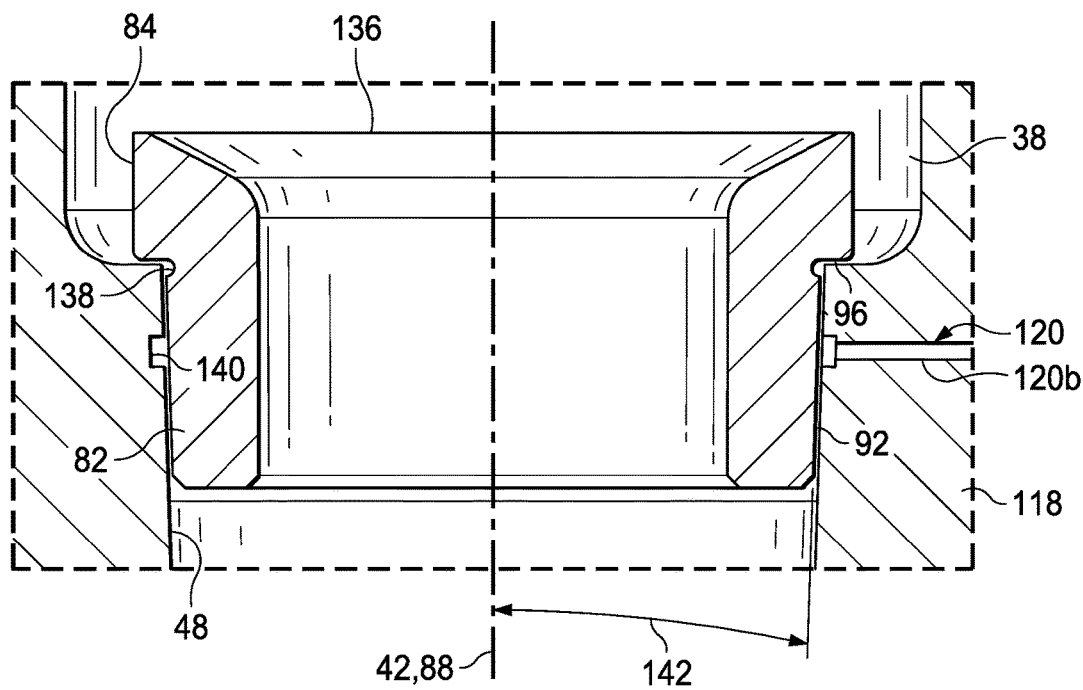
FIG. 7 is a view similar to that of FIG. 6 but depicting the annular channel formed in an inside surface of a cylinder block of the fluid end, according to an exemplary embodiment.

In an exemplary embodiment, as illustrated in FIGS. 5 and 6 with continuing reference to FIG. 4, the inlet valve 124 includes a valve seat 136, rather than the valve seat 78. The valve seat 136 includes several features that are identical to corresponding features of the valve seat 78, which identical features are given the same reference numerals. The valve seat 136 is disposed within the fluid passage 38 so that the outside surface 92 of the seat body 82 engages the inside surface 48 of the cylinder block 118. An annular notch 138 is formed in the outside surface 92 of the valve seat 136, adjacent the annular surface 96. Additionally, an annular channel 140 is formed in the outside surface 92 of the valve seat 136. Instead of, or in addition to, being formed in the outside surface 92 of the valve seat 136, the annular channel 140 of the inlet valve 124 may be formed in the inside surface 48 of the cylinder block 118, as shown in FIG. 7. In any event, when the outside surface 92 of the valve seat 136 engages the inside surface 48 of the cylinder block 118, the annular channel 140 is located axially between the annular notch 138 and the end of the valve seat 136 opposite the enlarged-diameter portion 84. Moreover, the annular channel 140 is substantially vertically aligned with the fluid bore 120b of the hydraulic port 120.

In an exemplary embodiment, as illustrated in FIGS. 6 and 7 with continuing reference to FIGS. 4 and 5, at least the end portion of the seat body 82 opposite the enlarged-diameter portion 84 is tapered at a taper angle 142 from the fluid passage axis 42 and the valve seat axis 88 aligned therewith. In an exemplary embodiment, instead of, or in addition to the end portion of the seat body 82 opposite the enlarged-diameter portion 84 being tapered, the inside surface 48 of the cylinder block 118 is tapered at the taper angle 142. In several exemplary embodiments, both the end portion of the seat body 82 opposite the enlarged-diameter portion 84 and the inside surface 48 of the cylinder block 118 are tapered at the taper angle 142. In an exemplary embodiment, the taper angle 142 ranges from about 0 degrees to about 5 degrees measured from the fluid passage axis 42 and the valve seat axis 88 aligned therewith. In an exemplary embodiment, the taper angle 142 ranges from about 1 degree to about 4 degrees measured from the fluid passage axis 42 and the valve seat axis 88 aligned therewith. In an exemplary embodiment, the taper angle 142 ranges from about 1 degree to about 3 degrees measured from the fluid passage axis 42 and the valve seat axis 88 aligned therewith. In an exemplary embodiment, the taper angle 142 is about 2 degrees measured from the fluid passage axis 42 and the valve seat axis 88 aligned therewith. In an exemplary embodiment, the taper angle 142 is about 1.8 degrees measured from the fluid passage axis 42 and the valve seat axis 88 aligned therewith.

In an exemplary embodiment, with continuing reference to FIGS. 5-7, the outlet valve 126 is identical to the inlet valve 124 and therefore will not be described in further detail. Accordingly, features of the outlet valve 126 that are identical to corresponding features of the inlet valve 124 will be given the same reference numerals as that of the inlet valve 124. The valve seat axis 88 of the outlet valve 126 is aligned with each of the fluid passage axis 42 and the valve seat axis 88 of the inlet valve 124. The outlet valve 126 is disposed in the fluid passage 40, and engages the cylinder block 118, in a manner that is identical to the manner in which the inlet valve 124 is disposed in the fluid passage 38, and engages the cylinder block 118, with the exception that the upper portion of the spring 112 (not shown) of the outlet valve 126 is compressed against the bottom of the another plug (not shown), rather than being compressed against a component that corresponds to the valve spring retainer 132, against which the upper portion of the spring 112 (not shown) of the inlet valve 124 is compressed. Moreover, in an exemplary embodiment, instead of, or in addition to, being formed in the outside surface 92 of the valve seat 136, the annular channel 140 of the outlet valve 126 may be formed in the inside surface 54 of the cylinder block 118; this exemplary embodiment of the outlet valve 126 with the annular channel 140 being formed in the inside surface 54 is not shown in the figures but is identical to the exemplary embodiment of the inlet valve 124 shown in FIG. 7. In any event, when the outside surface 92 of the outlet valve 126 engages the inside surface 54 of the cylinder block 118, the annular channel 140 is located axially between the annular notch 138 and the end of the valve seat 136 opposite the enlarged-diameter portion 84. Moreover, the annular channel 140 is substantially vertically aligned with the fluid bore 122*b* of the hydraulic port 122; this alignment is shown in FIG. 5.

In an exemplary embodiment, the fluid end 14 is omitted from the reciprocating pump assembly 10 in favor of the fluid end 116, including the cylinder block 118, the inlet valve 124, the outlet valve 126, the plug 128, the fastener 130, the another plug, the another fastener, the valve spring retainer 132, and the hub 134. In an exemplary embodiment, the operation of the reciprocating pump assembly 10 using the fluid end 116 is identical to the above-described operation of the reciprocating pump assembly 10 using the fluid end 14. Therefore, the operation of the reciprocating pump assembly 10 using the fluid end 116 will not be discussed in further detail. In an exemplary embodiment, the operation of the inlet valve 124 using the valve seat 136 is identical to the above-described operation of the inlet valve 56 using the valve seat 78. Therefore, the operation of the inlet valve 124 using the valve seat 136 will not be described in further detail. Similarly, in an exemplary embodiment, the operation of the outlet valve 126 using the valve seat 136 is identical to the above-described operation of the outlet valve 126 using the valve seat 78. Therefore, the operation of the outlet valve 126 using the valve seat 136 will not be described in further detail.

Figure 8:
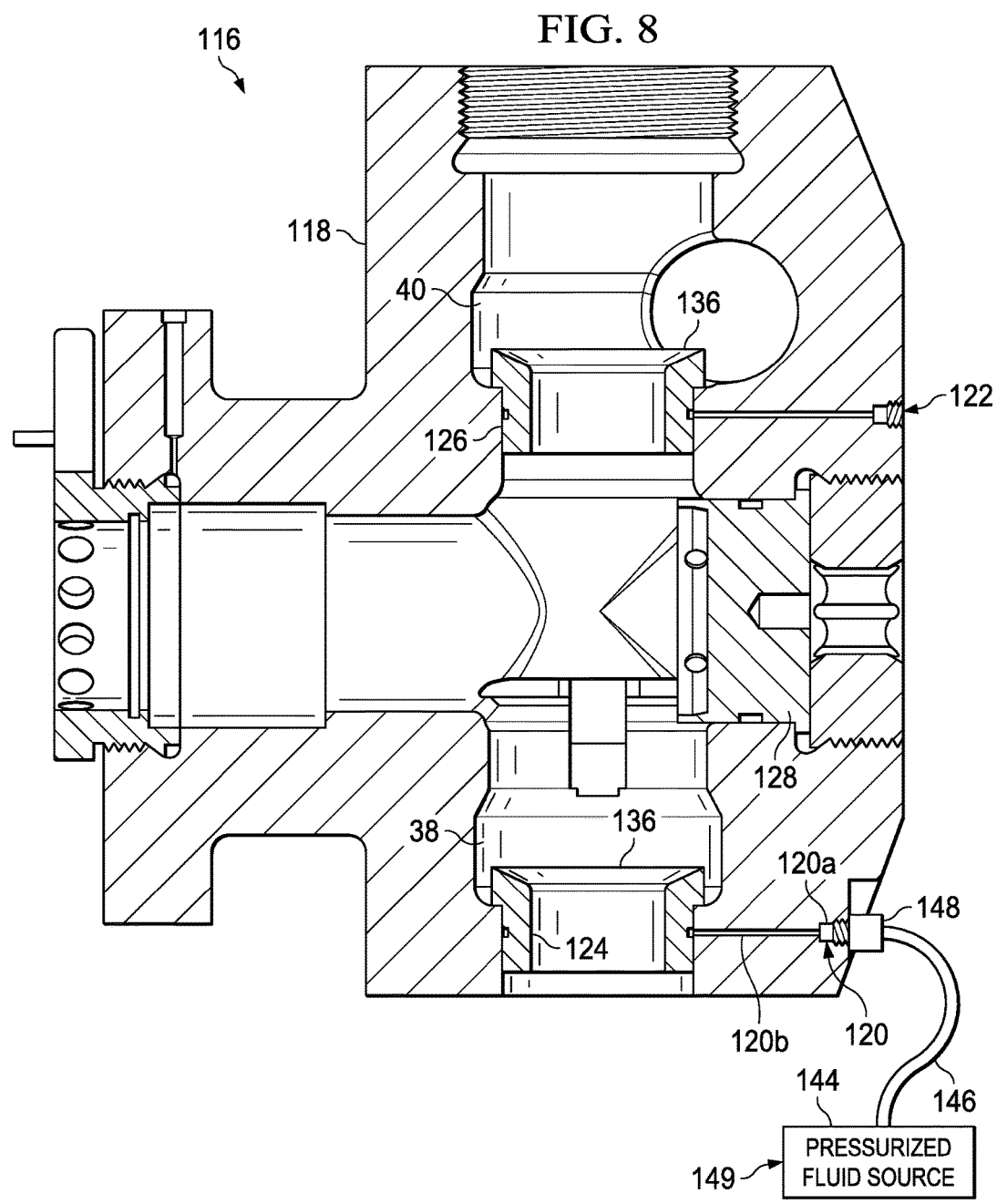
FIG. 8 is a partial sectional/partial diagrammatic view of a system for removing a valve seat from the fluid end of FIG. 4, according to an exemplary embodiment.
Figure 9:
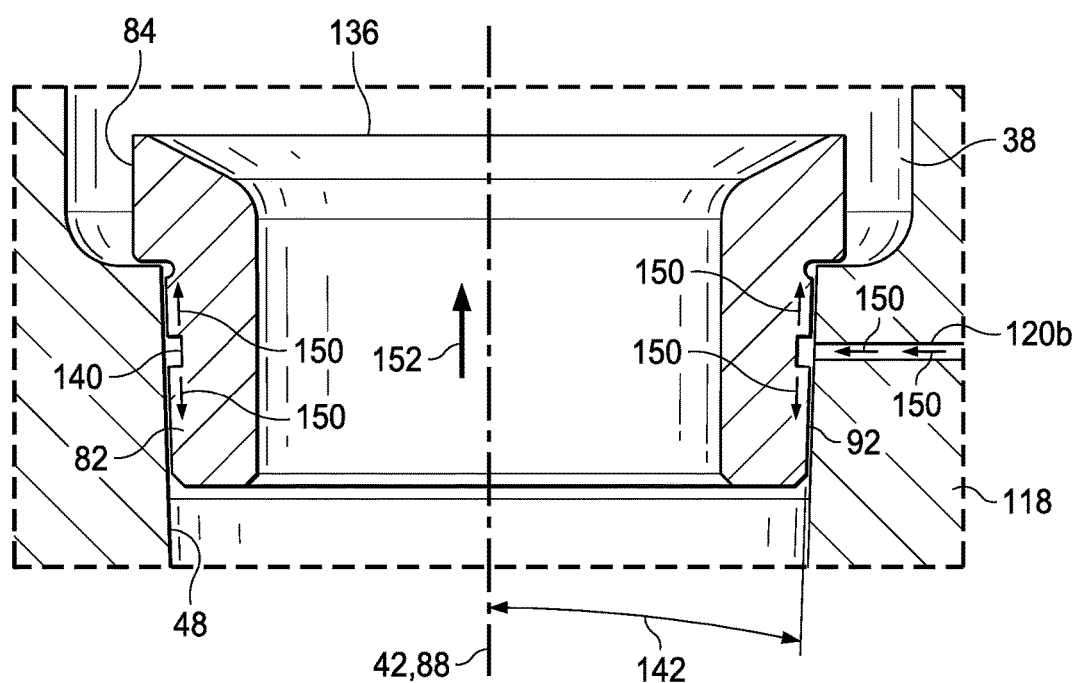
FIG. 9 is a sectional view of the valve seat of FIG. 8 during its removal from the fluid end of FIG. 4, according to an exemplary embodiment.

Before or after the operation of the fluid end 116, in several exemplary embodiments, the valve seat 136 of the inlet valve 124 may be removed from the fluid end 116. More particularly, in an exemplary embodiment, as illustrated in FIGS. 8 and 9 with continuing reference to FIGS. 1-7, a pressurized fluid source 144 is connected to the hydraulic port 120 to facilitate the removal of the valve seat 136 of the inlet valve 124 from the fluid end 116. Specifically, the pressurized fluid source 144 is placed in fluid communication with the hydraulic port 120 via a hydraulic conduit 146, which extends from the pressurized fluid source 144 and is connected to the internal threaded connection 120*a* via a fluid line connector 148. In several exemplary embodiments, the pressurized fluid source 144, the hydraulic conduit 146, and the fluid line connector 148 may be part of a system 149. Once connected via the hydraulic conduit 146, the pressurized fluid source 144 pressurizes a hydraulic fluid 150, causing the hydraulic fluid 150 to flow through the hydraulic conduit 146, through the fluid bore 120*b*, into the annular channel 140, and around the seat body 82 until the pressurized fluid 150 is evenly distributed within the annular channel 140. In an exemplary embodiment, the pressurized fluid source 144 is a hydraulic jack. Alternatively, the pressurized fluid source 144 may be a pump, a compressor, another device for moving the hydraulic fluid 150 by mechanical action, or the like.

Subsequently, as the pressurized fluid source 144 increases the pressure of the hydraulic fluid 150, the hydraulic fluid 150 radially compresses the seat body 82. Moreover, the hydraulic fluid 150 migrates along the interface between the outside surface 92 of the valve seat 136 and the inside surface 48 of the cylinder block 118, thus forming a lubricating film therebetween. The pressurized fluid source 144 continues to increase the pressure of the hydraulic fluid 150 until a breakaway threshold is reached, at which threshold the radial compression of the seat body 82 and the lubricating film formed by the hydraulic fluid 150, in combination, cause the extraction force to exceed the force(s) (frictional or otherwise) used to hold the valve seat 136 in place in the cylinder block 118. As a result, the extraction force causes the valve seat 136 to be ejected from the fluid passage 38 of the cylinder block 118 in the direction 152. After this ejection, in several exemplary embodiments, the valve seat 136 may be removed from the fluid end 116 via, for example, the counterbore 60 or 62.

In an exemplary embodiment, the pressurized fluid source 144 is connected to the hydraulic port 122 to facilitate the removal of the valve seat 136 of the outlet valve 126 from the fluid passage 40. The valve seat 136 of the outlet valve 126 is removed from the fluid passage 40 in a manner that is identical to the manner in which the valve seat 136 of the inlet valve 124 is removed from the fluid passage 38. Therefore, the removal of the valve seat 136 of the outlet valve 126 from the fluid passage 40 will not be discussed in further detail.

In an exemplary embodiment, during the above-described operation of the pressurized fluid source 144 to remove the valve seat 136 from the fluid passage 38 (or the fluid passage 40) of the cylinder block 118, the taper angle 142 reduces the breakaway threshold (i.e., the pressure of the hydraulic fluid 150) necessary to remove the valve seat 136 from the fluid passage 38. In an exemplary embodiment, during the above-described operation of the pressurized fluid source 144 to remove the valve seat 136 from the fluid passage 38 (or the fluid passage 40) of the cylinder block 118, the taper angle 142 creates the extraction force imparted to the valve seat 136. The combination of the radial compression of the seat body 82 and the lubricating film formed by the hydraulic fluid 150 at the interface between the inside and outside surfaces 48 and 92, respectively, reduces the frictional holding force on the seat body 82, which allows the extraction force to eject the valve seat 136.

Figure 10:
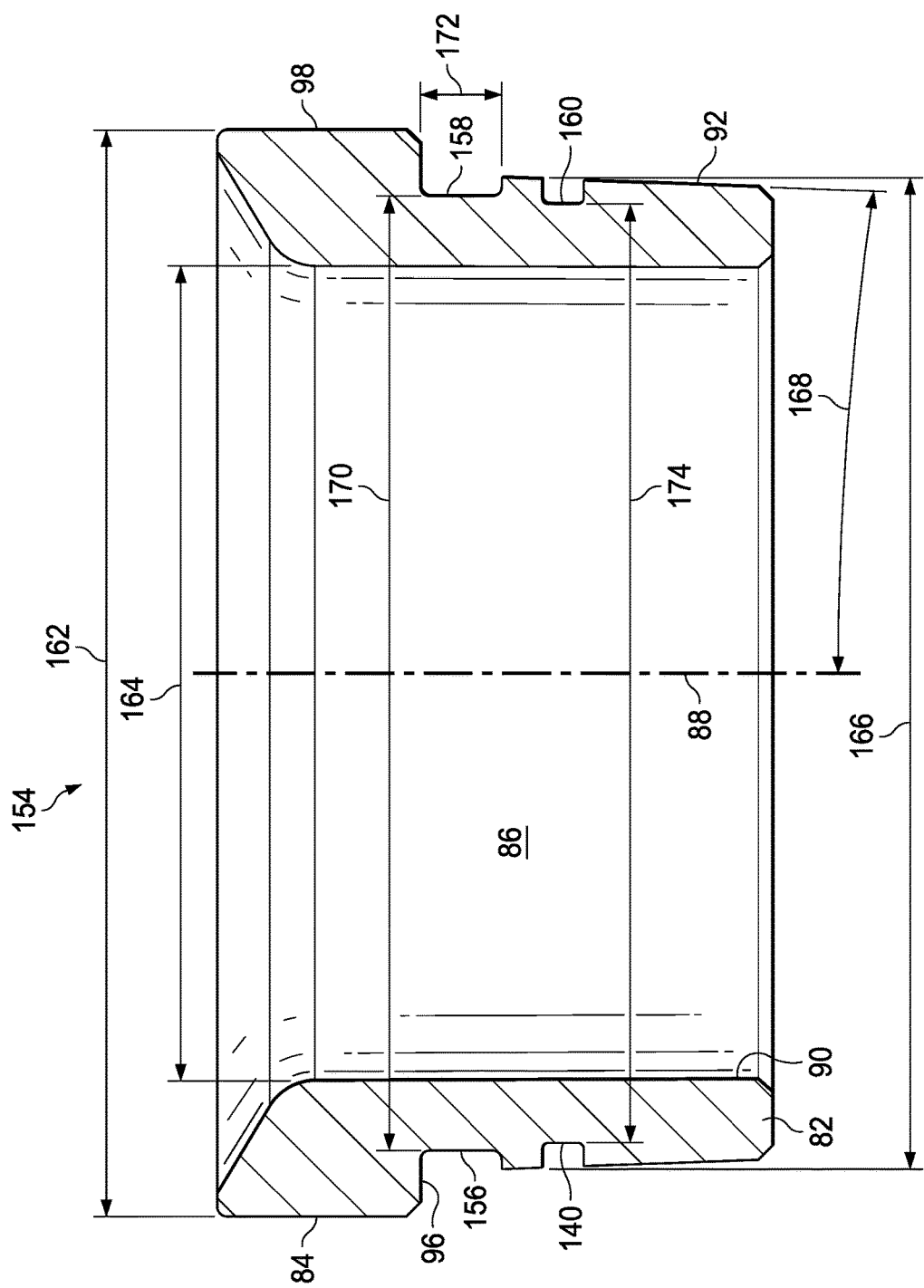
FIGS. 10, 11, and 12 are respective sectional views of valve seats each of which is configured to be removed from the fluid end of FIG. 4 using the system of FIG. 8, according to respective exemplary embodiments.

In an exemplary embodiment, as illustrated in FIG. 10 with continuing reference to FIGS. 1-9, a valve seat is generally referred to by the reference numeral 154 and includes several features that are identical to corresponding features of the valve seat 136, which identical features are given the same reference numerals. The valve seat 154 includes an annular notch 156, rather than the annular notch 138. The annular notch 156 is formed in the outside surface 92 of the valve seat 154, adjacent the annular surface 96, so that the annular channel 140 is positioned axially between the annular notch 156 and the end of the valve seat 154 opposite the enlarged-diameter portion 84. The annular notch 156 defines an outside cylindrical surface 158 of the valve seat 154. Similarly, the annular channel 140 of the valve seat 154 defines an outside cylindrical surface 160 of the valve seat 154. The outside surface 92 of the valve seat 154 is tapered radially inward beginning at an axial location therealong adjacent the annular notch 156, and ending at the end of the seat body 82 opposite the enlarged-diameter portion 84.

The cylindrical surface 98 defined by the enlarged-diameter portion 84 of the valve seat 154 defines an outside diameter 162. In an exemplary embodiment, the outside diameter 162 is about 5 inches. In an exemplary embodiment, the outside diameter 162 is greater than 5 inches. The inside surface 90 of the valve seat 154 defined by the bore 86 formed therethrough defines an inside diameter 164. In an exemplary embodiment, the inside diameter 164 ranges from about 3 inches to about 3.5 inches. In an exemplary embodiment, the inside diameter 164 is greater than 3.25 inches.

The outside surface 92 of the valve seat 154 defines an outside diameter 166 at the axial location therealong where the radially inward tapering of the outside surface 92 begins (i.e., adjacent the annular notch 156). In an exemplary embodiment, the outside diameter 166 ranges from about 3 inches to about 5 inches. In an exemplary embodiment, the outside diameter 166 ranges from about 3.5 inches to about 5 inches. In an exemplary embodiment, the outside diameter 166 ranges from about 3.5 inches to about 4.5 inches. In an exemplary embodiment, the outside diameter 166 ranges from about 3.5 inches to about 4 inches. In an exemplary embodiment, the outside diameter 166 is less than 3.5 inches. In an exemplary embodiment, the outside diameter 166 is closer in size to the outside diameter 162 than to the inside diameter 164. In an exemplary embodiment, the outside diameter 166 is closer in size to the inside diameter 164 than to the outside diameter 162. In an exemplary embodiment, the ratio of the difference between the outside diameter 162 and the outside diameter 166 to the difference between the outside diameter 166 and the inside diameter 164 is about 1.

The radially inward tapering of the outside surface 92 defines a taper angle 168 from the valve seat axis 88. In an exemplary embodiment, instead of, or in addition the outside surface 92 of the valve seat 154 being tapered radially inward, the inside surface 48 of the cylinder block 118 is tapered at the taper angle 168. In several exemplary embodiments, both the outside surface 92 of the valve seat 154 and the inside surface 48 of the cylinder block 118 are tapered at the taper angle 168. In an exemplary embodiment, the taper angle 168 ranges from about 0 degrees to about 5 degrees measured from the valve seat axis 88. In an exemplary embodiment, the taper angle 168 ranges from greater than 0 degrees to about 5 degrees measured from the valve seat axis 88. In an exemplary embodiment, the taper angle 168 ranges from about 1 degree to about 4 degrees measured from the valve seat axis 88. In an exemplary embodiment, the taper angle 168 ranges from about 1 degree to about 3 degrees measured from the valve seat axis 88. In an exemplary embodiment, the taper angle 168 is about 2 degrees measured from the valve seat axis 88. In an exemplary embodiment, the taper angle 168 is about 1.8 degrees measured from the valve seat axis 88.

The outside cylindrical surface 158 defined by the annular notch 156 defines an outside diameter 170 and a length 172. In an exemplary embodiment, the outside diameter 170 is closer in size to the inside diameter 164 than to the outside diameter 162. In an exemplary embodiment, the outside diameter 170 is closer in size to the outside diameter 162 than to the inside diameter 164. In an exemplary embodiment, the ratio of the difference between the outside diameter 162 and the outside diameter 170 to the difference between the outside diameter 170 and the inside diameter 164 is about 1. In an exemplary embodiment, the outside diameter 170 is closer in size to the outside diameter 166 than to the inside diameter 164. In an exemplary embodiment, the outside diameter 170 is closer in size to the inside diameter 164 than to the outside diameter 166. In an exemplary embodiment, the ratio of the difference between the outside diameter 166 and the outside diameter 170 to the difference between the outside diameter 170 and the inside diameter 164 is about 1.

In an exemplary embodiment, the ratio of the length 172 to the overall length of the seat body 82 (i.e., the distance from the annular surface 96 to the end of the seat body 82 opposite the enlarged-diameter portion 84) ranges from about 0.1 to about 0.4. In an exemplary embodiment, the ratio of the length 172 to the overall length of the seat body 82 ranges from about 0.15 to about 0.3. In an exemplary embodiment, the ratio of the length 172 to the overall length of the seat body 82 ranges from about 0.2 to about 0.25. In an exemplary embodiment, the ratio of the length 172 to the overall length of the seat body 82 is about 0.25.

The outside cylindrical surface 160 defined by the annular channel 140 of the valve seat 154 defines a channel diameter 174. In an exemplary embodiment, the channel diameter 174 ranges from about 3 inches to less than 5 inches. In an exemplary embodiment, the channel diameter 174 ranges from about 3.5 inches to less than 5 inches. In an exemplary embodiment, the channel diameter 174 ranges from about 3.5 inches to less than 4.5 inches. In an exemplary embodiment, the channel diameter 174 ranges from about 3.5 inches to less than 4 inches. In an exemplary embodiment, the channel diameter 174 ranges from about 4 inches to about 4.5 inches. In an exemplary embodiment, the channel diameter 174 is about 4.292 inches. In an exemplary embodiment, the channel diameter 174 is less than 4 inches. In an exemplary embodiment, the channel diameter 174 is closer in size to the outside diameter 166 than to the inside diameter 164. In an exemplary embodiment, the channel diameter 174 is closer in size to the inside diameter 164 than to the outside diameter 166. In an exemplary embodiment, the ratio of the difference between the outside diameter 166 and the channel diameter 174 to the difference between the channel diameter 174 and the inside diameter 164 is about 1.

Although possible dimensions for the outside diameter 162, the inside diameter 164, the outside diameter 166, the taper angle 168, the outside diameter 170, the length 172, and the channel diameter 174 have been described above, dimensions other than these possible dimensions could also be utilized depending on the specific characteristics of the fluid end in which the valve seat 154 is incorporated.

In an exemplary embodiment, the valve seat 136 is omitted from the inlet valve 124 in favor of the valve seat 154, which is disposed in the fluid passage 38. Similarly, in an exemplary embodiment, the valve seat 136 is omitted from the outlet valve 126 in favor of the valve seat 154, which is disposed in the fluid passage 40. In an exemplary embodiment, the valve seat 136 is omitted from the inlet valve 124 in favor of the valve seat 154, and the valve seat 136 is omitted from the outlet valve 126 in favor of the valve seat 154. In an exemplary embodiment, the operation of the inlet valve 124 using the valve seat 154 is identical to the above-described operation of the inlet valve 56 using the valve seat 136. Therefore, the operation of the inlet valve 124 using the valve seat 154 will not be described in further detail. Similarly, in an exemplary embodiment, the operation of the outlet valve 126 using the valve seat 154 is identical to the above-described operation of the outlet valve 126 using the valve seat 136. Therefore, the operation of the outlet valve 126 using the valve seat 154 will not be described in further detail.

In an exemplary embodiment, the pressurized fluid source 144 is connected to the hydraulic port 120 to facilitate the removal of the valve seat 154 of the inlet valve 124 from the fluid passage 38 of the cylinder block 118. The operation of the pressurized fluid source 144 to remove the valve seat 154 of the inlet valve 124 from the fluid passage 38 is identical to the above-described operation of the pressurized fluid source 144 to remove the valve seat 136 from the fluid passage 38. In an exemplary embodiment, the pressurized fluid source 144 is connected to the hydraulic port 122 to remove the valve seat 154 of the outlet valve 126 from the fluid passage 40 in a manner that is identical to the manner in which the valve seat 154 of the inlet valve 124 is removed from the fluid passage 38.

In an exemplary embodiment, during the above-described operation of the pressurized fluid source 144 to remove the valve seat 154 from the fluid passage 38 (or the fluid passage 40) of the cylinder block 118, the taper angle 168 reduces the breakaway threshold (i.e., the pressure of the hydraulic fluid 150) necessary to remove the valve seat 154 from the fluid passage 38. In an exemplary embodiment, during the above-described operation of the pressurized fluid source 144 to remove the valve seat 154 from the fluid passage 38 (or the fluid passage 40) of the cylinder block 118, the taper angle 168 creates the extraction force imparted to the valve seat 154. The combination of the radial compression of the seat body 82 and the lubricating film formed by the hydraulic fluid 150 at the interface between the inside and outside surfaces 48 and 92, respectively, reduces the frictional holding force, which allows the extraction force to eject the valve seat 154.

In an exemplary embodiment, during the above-described operation of the pressurized fluid source 144 to remove the valve seat 154 from the fluid passage 38 (or the fluid passage 40) of the cylinder block 118, the annular notch 156 increases the radial compressibility of the seat body 82 by decoupling the stiffness of the enlarged-diameter portion 84 from the remainder of the seat body 82. In an exemplary embodiment, during the above-described operation of the pressurized fluid source 144 to remove the valve seat 154 from the fluid passage 38 (or the fluid passage 40) of the cylinder block 118, the annular notch 156 increases the effectiveness of the lubricating film formed by the hydraulic fluid 150 at the interface between the outside surface 92 and the inside surface 48 (or the inside surface 54), by reducing the contact area between the outside surface 92 and the inside surface 48 (or the inside surface 54).

Figure 11:
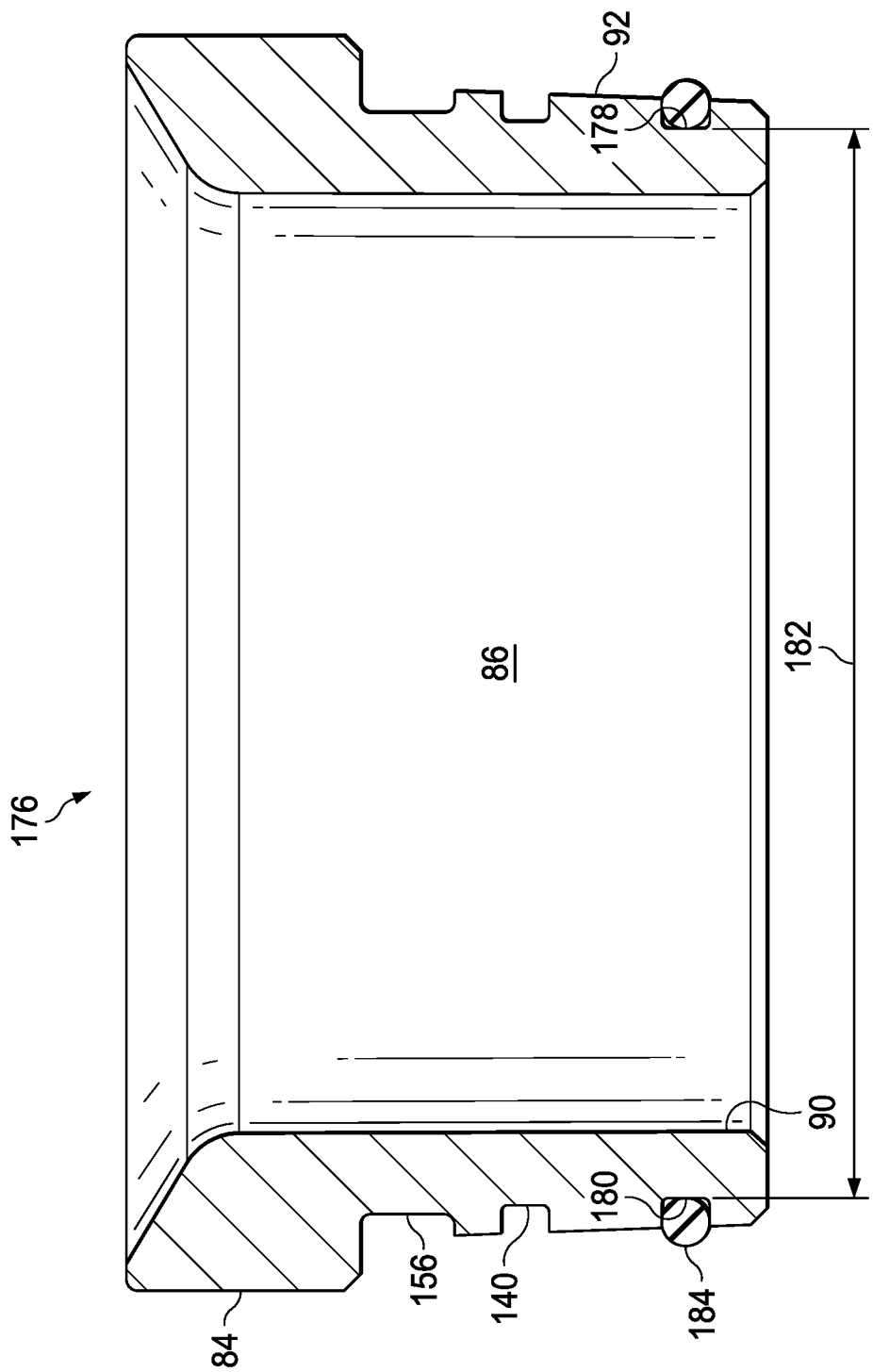

In an exemplary embodiment, as illustrated in FIG. 11 with continuing reference to FIGS. 1-10, a valve seat is generally referred to by the reference numeral 176 and includes several features that are identical to corresponding features of the valve seat 154, which identical features are given the same reference numerals. An annular groove 178 is formed into the outside surface 92 of the valve seat 176, axially between the annular channel 140 and the end of the valve seat 176 opposite the enlarged-diameter portion 84. Alternatively, the annular groove 178 may be positioned axially between the annular channel 140 and the annular notch 156. The annular groove 178 defines an outside annular surface 180 in the valve seat 176. The outside annular surface 180 defines a groove diameter 182. In an exemplary embodiment, the groove diameter 182 ranges from about 4 inches to about 4.5 inches. In an exemplary embodiment, the groove diameter 182 is about 4.292 inches. A sealing element, such as an O-ring 184, is disposed in an annular groove 178 formed in the outside surface 92. In an exemplary embodiment, the annular groove 178 and the O-ring 184 may be omitted from the valve seat 176 in favor of another sealing mechanism, such as, for example, a metal-to-metal seal.

Although possible dimensions for the outside diameter 162, the inside diameter 164, the outside diameter 166, the taper angle 168, the outside diameter 170, the length 172, the channel diameter 174, and the groove diameter 182 have been described above, dimensions other than these possible dimensions could also be utilized depending on the specific characteristics of the fluid end in which the valve seat 176 is incorporated.

In an exemplary embodiment, the valve seats 136 and 154 are omitted from the inlet valve 124 in favor of the valve seat 176, which is disposed in the fluid passage 38. As a result, the O-ring 184 sealingly engages the inside surface 48 of the cylinder block 118 and the outside annular surface 180 of the valve seat 176. Similarly, in an exemplary embodiment, the valve seats 136 and 154 are omitted from the outlet valve 126 in favor of the valve seat 176, which is disposed in the fluid passage 40. As a result, the O-ring 184 sealingly engages the inside surface 54 of the cylinder block 118 and the outside annular surface 180 of the valve seat 176.

In an exemplary embodiment, each of the inlet valve 124 and the outlet valve 126 includes the valve seat 176, rather than the valve seat 136 or 154. As a result, the O-ring 184 of the inlet valve 124 sealingly engages the inside surface 48 of the cylinder block 118 and the outside annular surface 180 of the valve seat 176. Moreover, the O-ring 184 of the outlet valve 126 sealingly engages the inside surface 54 of the cylinder block 118 and the outside annular surface 180 of the valve seat 176.

In an exemplary embodiment, the operation of the inlet valve 124 using the valve seat 176 is identical to the above-described operations of the inlet valve 124 using the valve seats 136 and 154. Therefore, the operation of the inlet valve 124 using the valve seat 176 will not be described in further detail. Similarly, in an exemplary embodiment, the operation of the outlet valve 126 using the valve seat 176 is identical to the above-described operations of the outlet valve 126 using the valve seats 136 and 154. Therefore, the operation of the outlet valve 126 using the valve seat 176 will not be described in further detail.

In an exemplary embodiment, the pressurized fluid source 144 is connected to the hydraulic port 120 to remove the valve seat 176 of the inlet valve 124 from the fluid passage 38 of the cylinder block 118. The operation of the pressurized fluid source 144 to remove the valve seat 176 of the inlet valve 124 from the fluid passage 38 is identical to the above-described operations of the pressurized fluid source 144 to remove the valve seats 136 and 154 from the fluid passage 38. In an exemplary embodiment, the pressurized fluid source 144 is connected to the hydraulic port 122 to remove the valve seat 176 of the outlet valve 126 from the fluid passage 40 in a manner that is identical to the manner in which the valve seat 176 is removed from the fluid passage 40.

In an exemplary embodiment, during the above-described operation of the pressurized fluid source 144 to remove the valve seat 176 from the fluid passage 38 (or the fluid passage 40) of the cylinder block 118, the O-ring 184 prevents, or at least reduces, leakage of the hydraulic fluid 150 from the interface between the inside and outside surfaces 48 and 92, respectively, at or near the end of the valve seat 136 opposite the enlarged-diameter portion 84. In an exemplary embodiment, during the above-described operation of the pressurized fluid source 144 to remove the valve seat 176 from the fluid passage 38 (or the fluid passage 40) of the cylinder block 118, the O-ring 184 maintains the seal that allows the hydraulic fluid pressure to build to compress the seat body 82 to reduce the frictional holding force resulting from the tapered interference fit. The lubricating film formed by retaining the hydraulic fluid 150 at the interface between the outside surface 92 and the inside surface 48 (or the inside surface 54) also reduces the frictional holding force.

Figure 12:
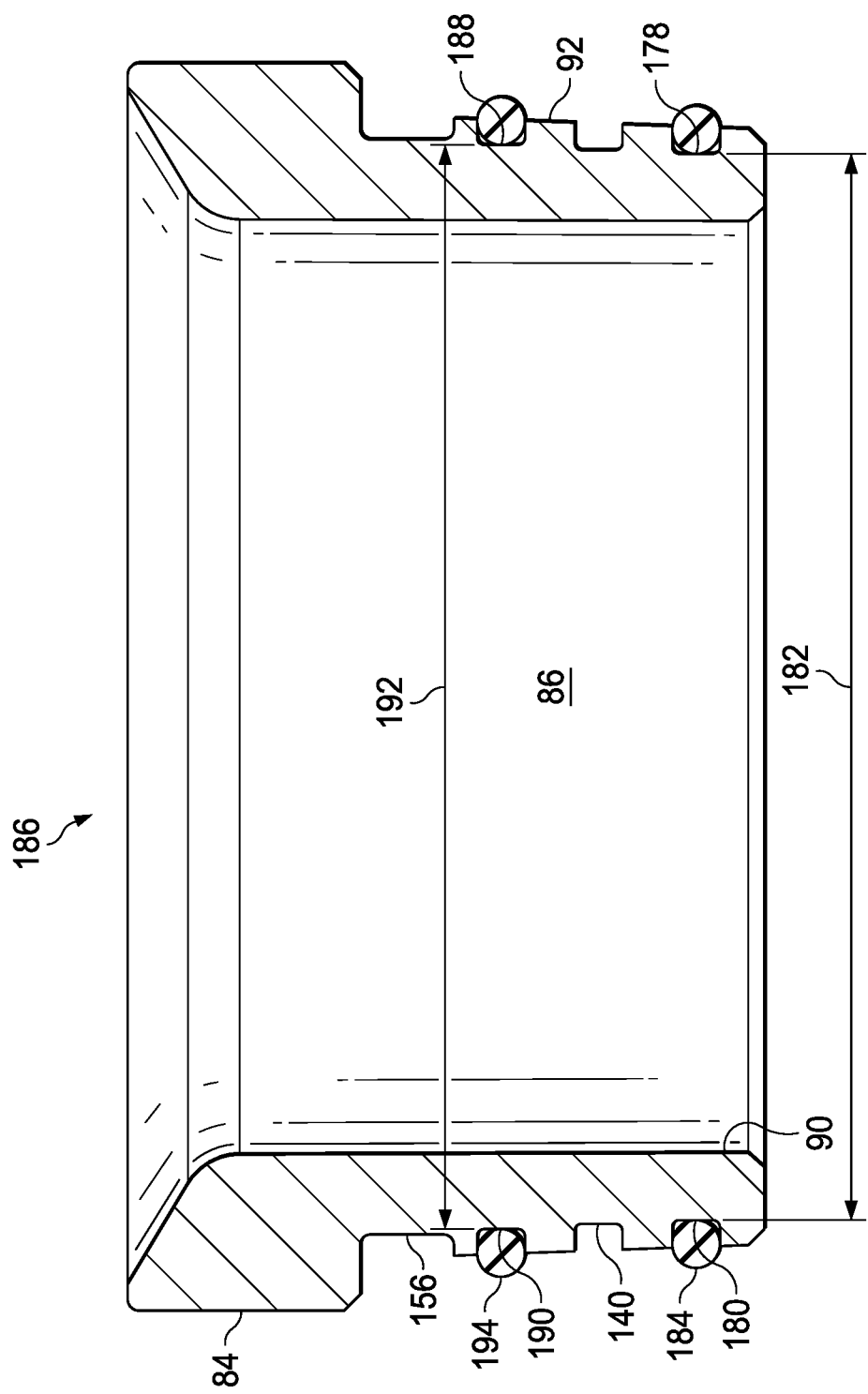

In an exemplary embodiment, as illustrated in FIG. 12 with continuing reference to FIGS. 1-11, a valve seat is generally referred to by the reference numeral 186 and includes several features that are identical to corresponding features of the valve seat 176, which identical features are given the same reference numerals. An annular groove 188 is formed into the outside surface 92 of the valve seat 186, axially between the annular channel 140 and the annular notch 156. The annular groove 188 is positioned on the side of the annular channel 140 opposite the annular groove 178. The annular groove 188 defines an outside annular surface 190 in the valve seat 186. The outside annular surface 190 defines a groove diameter 192. In an exemplary embodiment, the groove diameter 192 ranges from about 4 inches to about 4.5 inches. In an exemplary embodiment, the groove diameter 192 is about 4.292 inches. A sealing element, such as an O-ring 194, is disposed in an annular groove 188 formed in the outside surface 92. In an exemplary embodiment, the annular groove 178 and the O-ring 184 are omitted from the valve seat 186 in favor of another sealing mechanism, such as, for example, a metal-to-metal seal. Similarly, in an exemplary embodiment, the annular groove 188 and the O-ring 194 are omitted from the valve seat 186 in favor of another sealing mechanism, such as, for example, a metal-to-metal seal.

Although possible dimensions for the outside diameter 162, the inside diameter 164, the outside diameter 166, the taper angle 168, the outside diameter 170, the length 172, the channel diameter 174, the groove diameter 182, and the groove diameter 192, have been described above, dimensions other than these possible dimensions could also be utilized depending on the specific characteristics of the fluid end in which the valve seat 186 is incorporated.

In an exemplary embodiment, the valve seats 136, 154, and 176 are omitted from the inlet valve 124 in favor of the valve seat 186, which is disposed in the fluid passage 38. As a result, the O-rings 184 and 194 sealingly engage the inside surface 48 of the cylinder block 118 and the outside annular surfaces 180 and 190, respectively, of the valve seat 186. Similarly, in an exemplary embodiment, the valve seats 136, 154, and 176 are omitted from the outlet valve 126 in favor of the valve seat 186, which is disposed in the fluid passage 40. As a result, the O-rings 184 and 194 sealingly engage the inside surface 54 of the cylinder block 118 and the outside annular surfaces 180 and 190, respectively, of the valve seat 186.

In an exemplary embodiment, each of the inlet valve 124 and the outlet valve 126 includes the valve seat 186, rather than the valve seats 136, 154, or 176. As a result, the O-rings 184 and 194 of the inlet valve 124 sealingly engage the inside surface 48 of the cylinder block 118 and the outside annular surfaces 180 and 190, respectively, of the valve seat 186. Moreover, the O-rings 184 and 194 of the outlet valve 126 sealingly engage the inside surface 54 of the cylinder block 118 and the outside annular surfaces 180 and 190, respectively, of the valve seat 186.

In an exemplary embodiment, the operation of the inlet valve 124 using the valve seat 186 is identical to the above-described operations of the inlet valve 124 using the valve seats 136, 154, and 176. Therefore, the operation of the inlet valve 124 using the valve seat 186 will not be described in further detail. Similarly, in an exemplary embodiment, the operation of the outlet valve 126 using the valve seat 186 is identical to the above-described operations of the outlet valve 126 using the valve seats 136, 154, and 176. Therefore, the operation of the outlet valve 126 using the valve seat 186 will not be described in further detail.

In an exemplary embodiment, the pressurized fluid source 144 is connected to the hydraulic port 120 to remove of the valve seat 186 of the inlet valve 124 from the fluid passage 38 of the cylinder block 118. The operation of the pressurized fluid source 144 to remove the valve seat 186 of the inlet valve 124 from the fluid passage 38 is identical to the above-described operations of the pressurized fluid source 144 to remove the valve seats 136, 154, and 176 from the fluid passage 38. In an exemplary embodiment, the pressurized fluid source 144 is connected to the hydraulic port 122 to remove the valve seat 186 of the outlet valve 126 from the fluid passage 40 in a manner that is identical to the manner in which the valve seat 186 is removed from the fluid passage 40.

In an exemplary embodiment, during the above-described operation of the pressurized fluid source 144 to remove the valve seat 186 from the fluid passage 38 (or the fluid passage 40) of the cylinder block 118, the O-ring 194 prevents, or at least reduces, leakage of the hydraulic fluid 150 from the interface between the outside surface 92 and the inside surface 48 (or the inside surface 54) at or near the enlarged-diameter portion 84 of the valve seat 186. In an exemplary embodiment, during the above-described operation of the pressurized fluid source 144 to remove the valve seat 186 from the fluid passage 38 (or the fluid passage 40) of the cylinder block 118, the O-rings 184 and 194, in combination, maintain the seal that allows the pressure of the hydraulic fluid to build to compress the valve seat 186, which reduces the frictional holding force created by the tapered interference fit. The lubricating film formed by retaining the hydraulic fluid 150 at the interface between the outside surface 92 and the inside surface 48 (or the inside surface 54) also reduces the frictional holding force.

Figure 13:
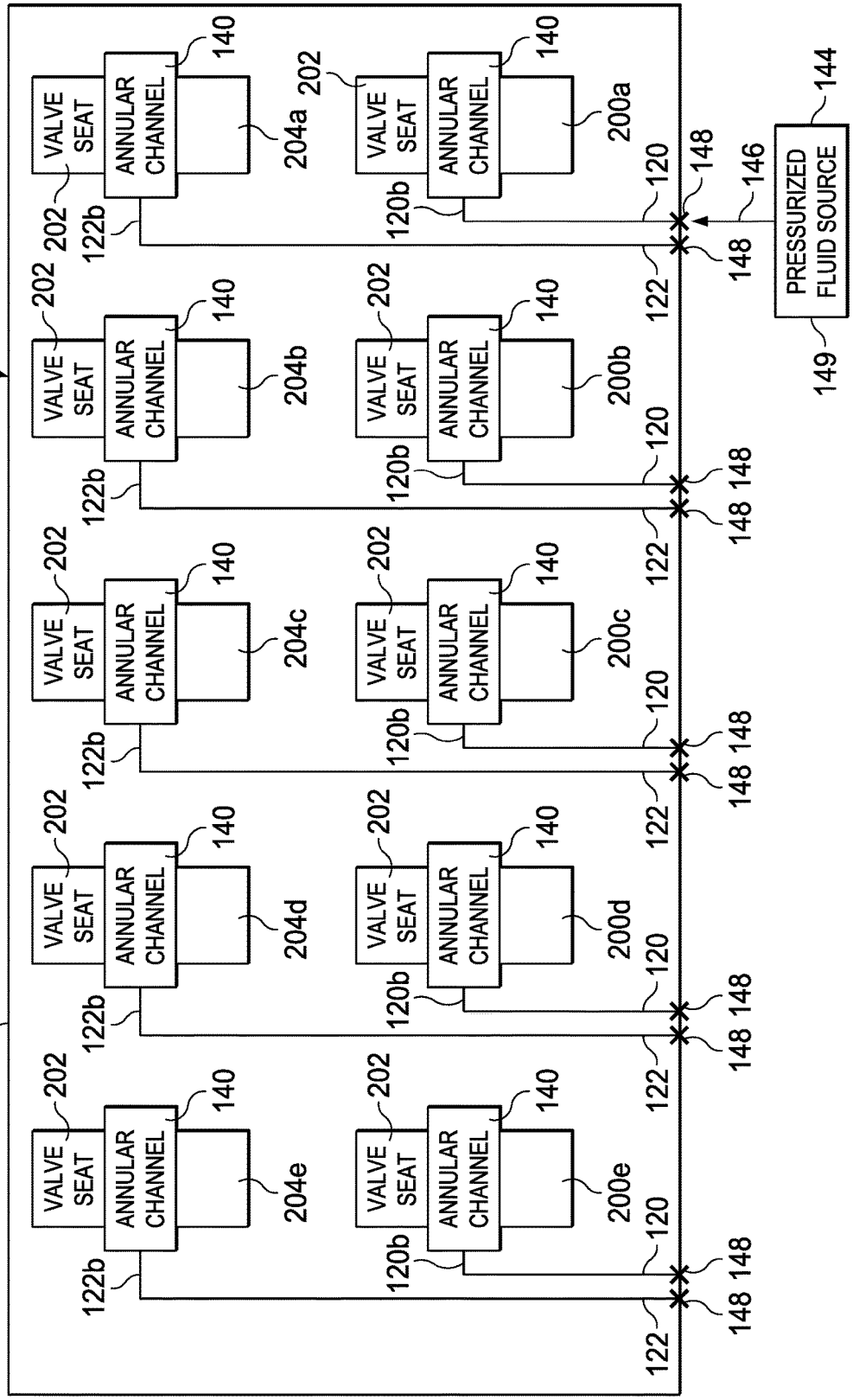
FIG. 13 is a diagrammatic view of a system for removing a valve seat from the fluid end of FIG. 4, according to an exemplary embodiment.

In an exemplary embodiment, as illustrated in FIG. 13 with continuing reference to FIGS. 1-12, a fluid end is generally referred to by the reference numeral 196 and includes several parts that are identical to corresponding parts of the fluid end 116, which identical parts are given the same reference numerals. The fluid end 196 includes a cylinder block 198. The cylinder block 198 is identical to the cylinder block 118 and therefore will not be described in further detail. Accordingly, features of the cylinder block 198 that are identical to corresponding features of the cylinder block 118 will be given the same reference numerals as the cylinder block 118. In an exemplary embodiment, inlet valves 200a-e, each including a valve seat 202 (shown schematically in FIG. 13), are disposed in the respective fluid passages 38 of the cylinder block 198 so that the valve seats 202 engage at least the respective surfaces 46 and 48 of the cylinder block 198. The inlet valves 200a-e of the fluid end 196 are each identical to the inlet valve 124 and therefore will not be described in further detail. Similarly, in an exemplary embodiment, outlet valves 204a-e, each including the valve seat 202 (shown schematically in FIG. 13), are disposed in the respective fluid passages 40 of the cylinder block 198 so that the valve seats 202 engage at least the respective surfaces 52 and 54 of the cylinder block 198. The outlet valves 204a-e of the fluid end 196 are each identical to the outlet valve 126 and therefore will not be described in further detail.

In several exemplary embodiments, one or more of the valve seats 202 are identical to the valve seat 136. In several exemplary embodiments, one or more of the valve seats 202 are identical to the valve seat 154. In several exemplary embodiments, one or more of the valve seats 202 are identical to the valve seat 176. In several exemplary embodiments, one or more of the valve seats 202 are identical to the valve seat 186. In any event, each of the valve seats 202 includes the annular channel 140 formed in the outside surface 92 thereof. In a manner similar to that described above, instead of, or in addition to, being formed in the respective outside surfaces 92 of the valve seats 202, the annular channels 140 may be formed in the respective inside surfaces 48 (and/or the respective inside surfaces 54) of the cylinder block 198.

In operation, in an exemplary embodiment, the pressurized fluid source 144 is connected to the hydraulic port 120 corresponding to the inlet valve 200a to remove the valve seat 202 from the fluid passage 38 of the cylinder block 198. Specifically, the pressurized fluid source 144 is placed in fluid communication with the hydraulic port 120 using the hydraulic conduit 146, which extends from the pressurized fluid source 144 and is connected to the hydraulic port 120 via the fluid line connector 148. The operation of the pressurized fluid source 144 to remove the valve seat 202 of the inlet valve 200a from the fluid passage 38 is identical to the above-described operations of the pressurized fluid source 144 to remove the valve seats 136, 154, 176, and 186 from the fluid passage 38. Therefore, the operation of the pressurized fluid source 144 to remove the valve seat 202 of the inlet valve 200a from the fluid passage 38 will not be discussed in further detail. The pressurized fluid source 144 is subsequently connected to the remaining hydraulic ports 120 and 122, one after the other, to remove the respective valve seats 202 of the inlet valves 200b-e and the outlet valves 204a-e from the respective fluid passages 38 and 40 of the cylinder block 198 in a manner that is identical to the manner in which the valve seat 202 of the inlet valve 200a is removed from the fluid passage 38.

Figure 14:
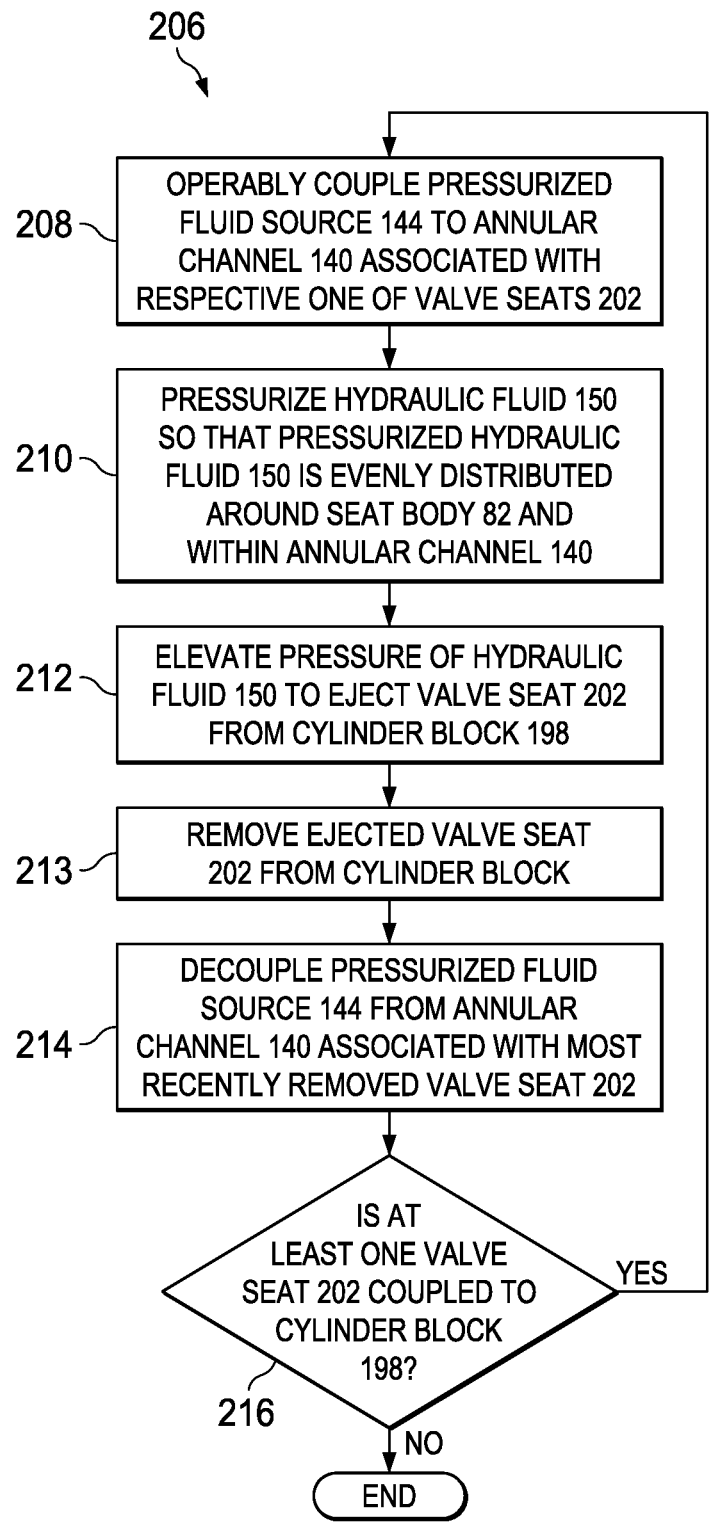
FIG. 14 is a flow chart illustration of a method of removing the valve seat from the fluid end of FIG. 13, according to an exemplary embodiment.

In an exemplary embodiment, as illustrated in FIG. 14 with continuing reference to FIGS. 1-13, a method of removing the valve seats 202 from the cylinder block 198 is generally referred to by the reference numeral 206. The method 206 includes operably coupling the pressurized fluid source 144 to the annular channel 140 associated with a respective one of the valve seats 202 at step 208, pressurizing the hydraulic fluid 150 so that the pressurized hydraulic fluid 150 is evenly distributed around the seat body 82 and within the annular channel 140 at step 210, elevating the pressure of the hydraulic fluid 150 to eject the valve seat 202 from the cylinder block 198 at step 212, removing the ejected valve seat 202 from the cylinder block 198 at step 213, and decoupling the pressurized fluid source 144 from the annular channel 140 associated with the most recently removed valve seat 202 at step 214. In an exemplary embodiment, the method 206 further includes determining whether at least one of the valve seats 202 remains coupled to the cylinder block 198 at step 216; if at least one of the valve seats 202 remains coupled to the cylinder block 198, the method 206 is repeated beginning with the step 208.

At the step 208, the pressurized fluid source 144 is operably coupled to the annular channel 140 associated with a respective one of the valve seats 202. In an exemplary embodiment, the pressurized fluid source 144 is operably coupled to the hydraulic channel 120 associated with one of the inlet valves 200a-e. In an exemplary embodiment, the pressurized fluid source 144 is operably coupled to the hydraulic channel 122 associated with one of the outlet valves 204a-e. In any event, the pressurized fluid source 144 is placed in fluid communication with the annular channel 140 via the hydraulic conduit 146, which extends from the pressurized fluid source 144 and is connected to the cylinder block 198 via the fluid line connector 148.

At the step 210 the hydraulic fluid 150 is pressurized so that the pressurized hydraulic fluid 150 is evenly distributed around the seat body 82 and within the annular channel 140. In an exemplary embodiment, the pressurized fluid source 144 pressurizes the hydraulic fluid 150, causing the hydraulic fluid 150 to flow through the hydraulic conduit 146, through the fluid channel 120b or 122b, into the annular channel 140, and around the seat body 82 until the pressurized hydraulic fluid 150 is evenly distributed within the annular channel 140.

At the step 212, the pressure of the hydraulic fluid 150 is elevated to eject the valve seat 202 from the cylinder block 198. In an exemplary embodiment, as the pressurized fluid source 144 increases the pressure of the hydraulic fluid 150, the hydraulic fluid 150 radially compresses the seat body 82. Moreover, the hydraulic fluid 150 migrates along the interface between the outside surface 92 of the valve seat 202 and the inside surface 48 or 54 of the cylinder block 198, thus forming a lubricating film therebetween. The pressurized fluid source 144 continues to increase the pressure of the hydraulic fluid 150 until a breakaway threshold is reached, at which threshold the radial compression of the seat body 82 and the lubricating film formed by the hydraulic fluid 150, in combination, cause the extraction force to exceed the forces (frictional or otherwise) used to hold the valve seat 202 in place in the cylinder block 198. As a result, the extraction force causes the valve seat 202 to be ejected from the fluid passage 38 or 40 of the cylinder block 198.

The ejected valve seat 202 is removed from the cylinder block 198 at the step 213 and, at the step 214, the pressurized fluid source 144 is decoupled from the annular channel 140 associated with the most recently removed valve seat 202. In an exemplary embodiment, the pressurized fluid source 144 is decoupled from the hydraulic channel 120 associated with one of the inlet valves 200a-e. In an exemplary embodiment, the pressurized fluid source 144 is decoupled from the hydraulic channel 122 associated with one of the outlet valves 204a-e. In any event, the hydraulic conduit 146 extending from the pressurized fluid source 144 is decoupled from the cylinder block 198.

At the step 216, the determination is made as to whether at least one of the valve seats 202 remains coupled to the cylinder block 198; if at least one of the valve seats 202 remains coupled to the cylinder block 198, the method 206 is repeated beginning with the step 208. In this manner, the method 206 is repeated until all of the valve seats 202 are removed from the cylinder block 198.

Figure 15:
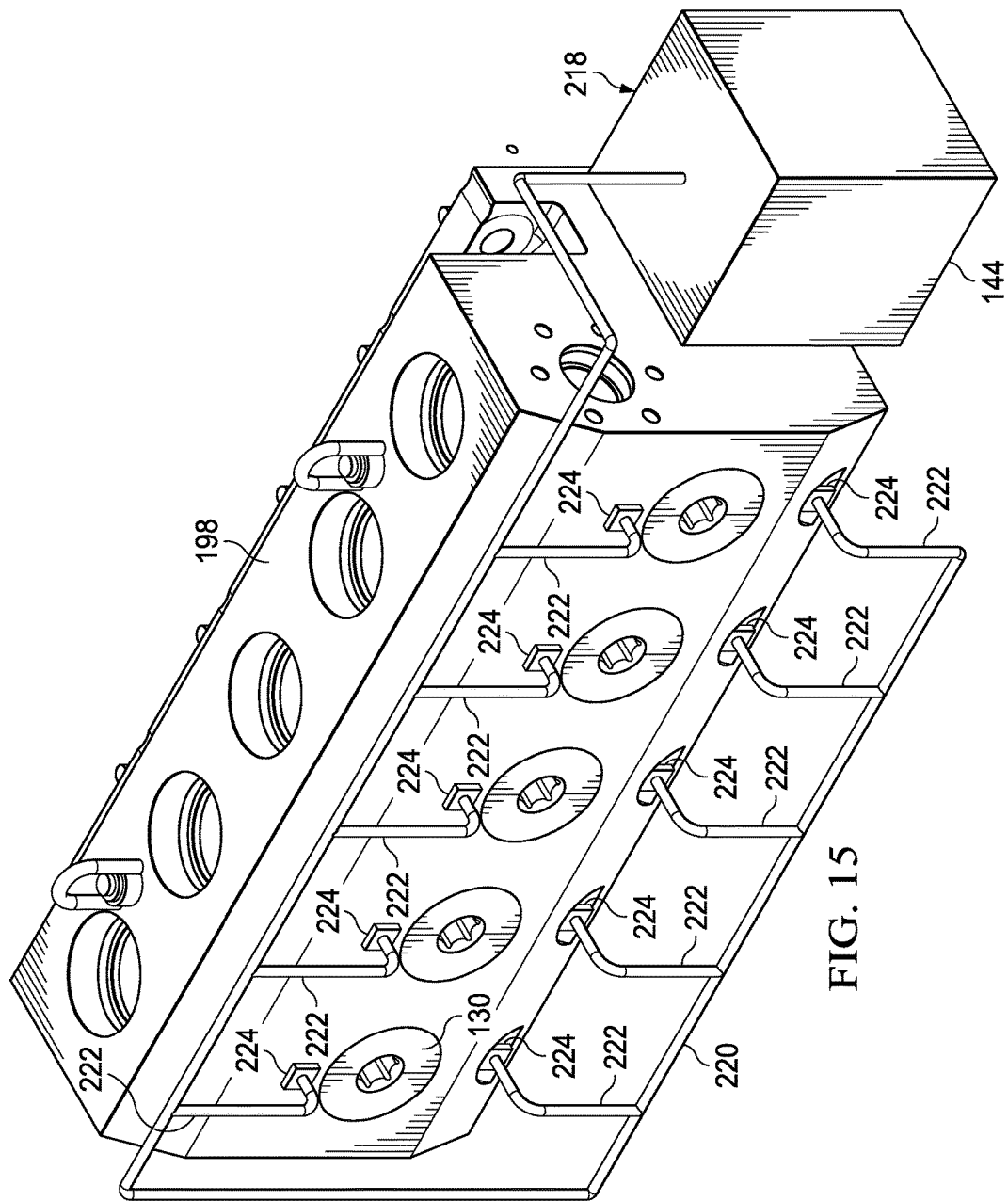
FIG. 15 is a perspective view of a system of contemporaneously removing multiple valve seats from the fluid end of FIG. 4, according to an exemplary embodiment.

In an exemplary embodiment, as illustrated in FIGS. 15 and 16 with continuing reference to FIGS. 1-14, a system for contemporaneously ejecting the valve seats 202 from the cylinder block 198 is generally referred to by the reference numeral 218. The system 218 includes the pressurized fluid source 144, a hydraulic manifold 220 operably coupled to, and in fluid communication with, the pressurized fluid source 144, and a plurality of hydraulic conduits 222 operably coupled to, and in fluid communication with, the hydraulic manifold 220. The hydraulic conduits 222 are each connected to one of the hydraulic ports 120 and 122 via a fluid line connector 224. The system 218 further includes a plurality of check valves 226a-j and a corresponding plurality of hydraulic fuses 228a-j (e.g., velocity fuses, burst valves, break valves, or the like) incorporated into the cylinder block 198, as shown in FIG. 16. The check valves 226a-e, in combination with respective ones of the hydraulic fuses 228a-e, are incorporated into the hydraulic ports 120 associated with the inlet valves 200a-e, respectively. Similarly, the check valves 226f-j, in combination with respective ones of the hydraulic fuses 228f-j, are incorporated into the hydraulic ports 122 associated with the outlet valves 204a-e, respectively. Alternatively, the check valves 226a-j, which, in combination with respective ones of the hydraulic fuses 228a-j, are incorporated into the hydraulic ports 120 and 122, may instead be incorporated into the hydraulic conduits 222 associated with the inlet valves 200a-e and the outlet valves 204a-e, respectively.

In operation, in an exemplary embodiment, the pressurized fluid source 144 is operably coupled to the hydraulic ports 120 and 122 in order to contemporaneously remove every one of the valve seats 220 associated with the inlet valves 200a-e and the outlet valves 204a-e from the cylinder block 198. Specifically, the pressurized fluid source 144 is operably coupled to every one of the hydraulic ports 120 and 122, via the hydraulic manifold 220, the plurality of hydraulic conduits 222, and the fluid line connectors 224. The pressurized fluid source 144 then pressurizes the hydraulic fluid 150, causing the hydraulic fluid 150 to flow through the hydraulic manifold 220, through the respective hydraulic conduits 222, through the respective hydraulic ports 120 and 122, into the annular channels 140 associated with the respective valve seats 202, and around the respective seat bodies 82 until the pressurized hydraulic fluid 150 is evenly distributed within the annular channels 140. During the above-described flow of the hydraulic fluid 150 from the pressurized fluid source 144 to the annular channels 140 of the respective valve seats 202, reverse flow through the hydraulic ports 120 and 122 is prevented, or at least reduced, by the check valves 226a-j. As a result, the check valves 226a-j prevent, or at least obstruct, the hydraulic fluid 150 from escaping the respective annular channels 140 via the associated hydraulic ports 120 or 122.

The pressurized fluid source 144 increases the pressure of the hydraulic fluid 150 so that the hydraulic fluid 150 radially compresses the seat bodies 82 associated with the inlet valves 200a-e and the outlet valves 204a-e. Moreover, as the pressure of the hydraulic fluid 150 increases, the hydraulic fluid 150 migrates along each of the interfaces between the respective outside surfaces 92 of the valve seats 202 and the inside surfaces 48 or 54 of the cylinder block 198, thus forming a lubricating film therebetween.

The pressurized fluid source 144 continues to increase the pressure of the hydraulic fluid 150 until each of the valve seats 202 reaches a breakaway threshold, at which threshold the radial compression of the seat body 82 and the lubricating film formed by the hydraulic fluid 150, in combination, cause the extraction force to exceed the forces (frictional or otherwise) used to hold the valve seat 202 in place in the cylinder block 198. Once a particular one of valve seats 202 reaches its breakaway threshold, the extraction force on the valve seat 202 causes the valve seat 202 to be ejected from the fluid passage 38 or 40 of the cylinder block 198.

In an exemplary embodiment, the breakaway thresholds of the respective valve seats 202 are slightly different from one another so that, as the pressure of the hydraulic fluid 150 increases, the valve seats 202 are ejected consecutively. During the above-described consecutive ejection of the valve seats 202 from the fluid passages 38 and 40, the flow of the hydraulic fluid 150 through each of the hydraulic ports 120 and 122 accelerates rapidly as the associated valve seat 202 is ejected. As the flow of the hydraulic fluid 150 through the hydraulic ports 120 and 122 accelerates rapidly, the associated hydraulic fuses 228a-j are actuated, thereby blocking, or at least impeding, the flow of the hydraulic fluid 150 into the corresponding fluid passage 38 or 40. As a result, the hydraulic fuses 228a-j prevent, or at least reduce, depressurization of the fluid manifold 220 during the above-described consecutive ejection of the valve seats 202 from the fluid passages 38 and 40. An exemplary embodiment of the hydraulic fuse 228a is illustrated in FIG. 17. In several exemplary embodiments, the hydraulic fuses 228a-j are identical to one another.

In an exemplary embodiment, as illustrated in FIG. 18 with continuing reference to FIGS. 1-17, a method of contemporaneously ejecting the valve seats 202 from the cylinder block 198 is generally referred to by the reference numeral 230. The method 230 includes operably coupling the pressurized fluid source 144 to every one of the annular channels 140 associated with the valve seats 202 of the inlet and outlet valves 200a-e and 204a-e, respectively, at step 232; pressurizing the hydraulic fluid 150 so that the pressurized hydraulic fluid 150 is evenly distributed around the respective seat bodies 82 of the inlet and outlet valves 200a-e and 204a-e, respectively, and within the annular channels 140 at step 234; blocking, or at least impeding, reverse flow through the hydraulic ports 120 and 122 using the check valves 226a-j at step 236; increasing the pressure of the hydraulic fluid 150 until at least one of the valve seats 202 is ejected from the fluid passages 38 or 40 of the cylinder block 198 at step 238; blocking, or at least impeding, using the hydraulic fuses 238a-j, the flow of the hydraulic fluid 150 into the fluid passages 38 and/or 40 associated with the ejected valve seats 202 at step 240. In an exemplary embodiment, the method 230 further includes determining whether at least one of the valve seats 202 remains coupled to the cylinder block 198 at step 242; if at least one of the valve seats 202 remains coupled to the cylinder block 198, the method 230 is repeated beginning with the step 238.

At the step 232, the pressurized fluid source 144 is operably coupled to every one of the annular channels 140 associated with the valve seats 202 of the inlet and outlet valves 200a-e and 204a-e, respectively. Specifically, the hydraulic conduits 222 are each connected to one of the hydraulic ports 120 and 122 via the fluid line connectors 224. Moreover, the check valves 226a-e, in combination with respective ones of the hydraulic fuses 228a-e, are incorporated into the hydraulic ports 120 associated with the inlet valves 200a-e, respectively. Similarly, the check valves 226f-j, in combination with respective ones of the hydraulic fuses 228f-j, are incorporated into the hydraulic ports 122 associated with the outlet valves 204a-e, respectively. Alternatively, the check valves 226a-j, which, in combination with respective ones of the hydraulic fuses 228a-j, are incorporated into the hydraulic ports 120 and 122, may instead be incorporated into the hydraulic conduits 222 associated with the inlet valves 200a-e and the outlet valves 204a-e, respectively.

At the step 234, the hydraulic fluid 150 is pressurized by the pressurized fluid source 144 so that hydraulic fluid 150 is evenly distributed around the respective seat bodies 82 of the inlet and outlet valves 200a-e and 204a-e, respectively, and within the annular channels 140. Specifically, the pressurization of the hydraulic fluid 150 by the pressurized fluid source 144 causes the hydraulic fluid 150 to flow through the hydraulic manifold 220, through the respective hydraulic conduits 222, through the respective hydraulic ports 120 and 122, into the annular channels 140 associated with the respective valve seats 202, and around the respective seat bodies 82 until the pressurized hydraulic fluid 150 is evenly distributed within the annular channels 140.

At the step 236, reverse flow through the hydraulic ports 120 and 122 is blocked, or at least impeded, using the check valves 226a-j. Specifically, during the above-described flow of the hydraulic fluid 150 from the pressurized fluid source 144 to the annular channels 140 of the respective valve seats 202, reverse flow through the hydraulic ports 120 and 122 is prevented, or at least reduced, by the check valves 226a-j. As a result, the check valves 226a-j prevent, or at least obstruct, the hydraulic fluid 150 from escaping the respective annular channels 140 via the associated hydraulic ports 120 or 122.

At the step 238, the pressure of the hydraulic fluid 150 is increased until at least one of the valve seats 202 is ejected from the fluid passages 38 and/or 40 of the cylinder block 198. Specifically, as the pressure of the hydraulic fluid 150 increases, the hydraulic fluid 150 radially compresses the seat bodies 82 associated with the inlet valves 200a-e and the outlet valves 204a-e. Moreover, the hydraulic fluid 150 migrates along each of the interfaces between the respective outside surfaces 92 of the valve seats 202 and the inside surfaces 48 or 54 of the cylinder block 198, thus forming a lubricating film therebetween. The pressurized fluid source 144 continues to increase the pressure of the hydraulic fluid 150 until each of the valve seats 202 reaches a breakaway threshold, at which threshold the radial compression of the seat body 82 and the lubricating film formed by the hydraulic fluid 150, in combination, cause the extraction force to exceed the forces (frictional or otherwise) used to hold the valve seat 202 in place in the cylinder block 198. Once a particular one of valve seats 202 reaches its breakaway threshold, the extraction force causes the valve seat 136 to be ejected from the fluid passage 38 or 40 of the cylinder block 198.

At the step 240, the flow of the hydraulic fluid 150 into the fluid passages 38 and/or 40 associated with the ejected valve seats 202 is blocked, or at least impeded, using the one or more of the hydraulic fuses 128a-j. Specifically, since the breakaway thresholds of the respective valve seats 202 may be slightly different from one another, as the pressure of the hydraulic fluid 150 increases, the valve seats 202 are ejected consecutively. During the above-described consecutive ejection of the valve seats 202 from the fluid passages 38 and 40, the flow of the hydraulic fluid 150 through each of the hydraulic ports 120 and 122 accelerates rapidly as the associated valve seat 202 is ejected. As the flow of the hydraulic fluid 150 through each of the hydraulic ports 120 and 122 accelerates rapidly, the associated hydraulic fuse 228a-j is actuated, thereby blocking, or at least impeding, the flow of the hydraulic fluid 150 into the corresponding fluid passage 38 or 40. As a result, the hydraulic fuses 228a-j prevent, or at least reduce, depressurization of the fluid manifold 220 during the above-described consecutive ejection of the valve seats 202 from the fluid passages 38 and 40.

At the step 242, the determination is made as to whether at least one of the valve seats 202 remains coupled to the cylinder block 198; if at least one of the valve seats 202 remains coupled to the cylinder block 198, the method 230 is repeated beginning with the step 238. In this manner, the steps 238 and 240 of the method are repeated until all of the valve seats 202 are ejected from the cylinder block 198.

Although systems and methods for ejecting and removing the valve seat(s) 136, 154, 176, 186, and/or 202 from the cylinder blocks 118 and/or 198 using hydraulic forces (i.e., the pressure and/or flow of the hydraulic fluid 150) have been described herein, it should be understood that other forces could be used to remove the valve seat(s) 136, 154, 176, 186, and/or 202 from the cylinder blocks 118 and/or 198, such as, for example, pneumatic forces. Accordingly, in an exemplary embodiment, the term "hydraulic" may be replaced with the term "pneumatic" throughout this description without departing from the scope of this disclosure.

In several exemplary embodiments, each of the valve seats 78, 136, 154, 176, 186, and 202 may extend within the fluid passage 38 or 40 of any one of the cylinder blocks 18, 118, and 198. In several exemplary embodiments, each of the valve seats 78, 136, 154, 176, 186, and 202 may be interchanged with any other one of the valve seats 78, 136, 154, 176, 186, 202.

In several exemplary embodiments, each of the valve seat removal systems and methods described above, including for example the systems 149 and 218 and the methods 206 and 230, provides a very simple and safe method of removing a valve seat from a fluid end of a reciprocating pump assembly. By providing a simple and safe method, equipment and manpower requirements for the removal of the valve seat are reduced, thereby meeting increased efficiency requirements during maintenance cycles.

In several exemplary embodiments, the tapering of (e.g., the taper angle 114, 142, or 168) of at least the end portion of the seat body 82 opposite the enlarged-diameter portion 84 is adjusted or "tuned" for even and/or otherwise proper pressure distribution around the seat body 82 during the removal of the valve seat of which the seat body 82 is a part. In several exemplary embodiments, the tapering of one or more of the inside surface 48, and the inside surface 54, and the end portion of the seat body 82 opposite the enlarged-diameter portion 84, is adjusted or "tuned" for even and/or otherwise proper pressure distribution around the seat body during the removal of the valve seat of which the seat body 82 is a part.

It is understood that variations may be made in the foregoing without departing from the scope of the present disclosure.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A valve seat, comprising:
   a generally cylindrical body defining a bore axially therethrough and having an outer surface;
   an enlarged diameter portion extending axially from the generally cylindrical body and defining a shoulder surface, the enlarged diameter portion having a sealing surface disposed opposite the shoulder surface, the sealing surface configured to form a seal with a displaceable portion of a valve;
   an annular notch formed in the outer surface of the generally cylindrical body and defining cylindrical surface having an axial length measured from and delimited by the shoulder surface, the annular notch decoupling a stiffness of the enlarged diameter portion to thereby increase a radial compressibility of the generally cylindrical body; and
   an annular channel formed in the outer surface of the generally cylindrical body and disposed axially below the annular notch, the annular channel configured to receive a hydraulic fluid to compress radially the generally cylindrical body;
   wherein a body length is measured from the shoulder surface to an end of the generally cylindrical body disposed opposite the enlarged diameter portion and a ratio of the axial length to the body length is 0.1-0.4.

2. The valve seat of claim 1 wherein the ratio of the axial length to the body length is approximately 0.25.

3. The valve seat of claim 1 wherein the cylindrical surface defined by the annular notch has a floor diameter, the enlarged diameter portion defines an outer diameter, and the bore defines an inner diameter, and wherein a difference between the floor diameter and the outer diameter is approximately equal to a difference between the floor diameter and the inner diameter.

4. The valve seat of claim 1 wherein the cylindrical surface defined by the annular notch has a floor diameter, the outer surface of the generally cylindrical body defines an outer diameter, and the bore defines an inner diameter, and wherein a difference between the floor diameter and the outer diameter is approximately equal to a difference between the floor diameter and the inner diameter.

5. The valve seat of claim 1 wherein a depth of the annular channel is approximately equal to a depth of the annular notch.

6. The valve seat of claim 1 further comprising a lower annular groove disposed axially below the annular channel, the lower annular groove configured to receive an O-ring.

7. The valve seat of claim 6 further comprising an upper annular groove disposed axially above the annular channel, the upper annular groove configured to receive an O-ring.

8. The valve seat of claim 1 wherein the outer surface of the generally cylindrical body is tapered.

9. The valve seat of claim 8 wherein an angle of the taper of the outer surface of the generally cylindrical body is 1-3 degrees.

10. The valve seat of claim 9 wherein the angle of the taper of the outer surface of the generally cylindrical body is 1.8 degrees.

11. A reciprocating pump, comprising:
    a power end, and
    a fluid end coupled to the power end, the fluid end comprising a cylinder block defining a fluid bore and a plurality of valve seats disposed in the fluid bore, at least one of the plurality of valve seats comprising:
    a generally cylindrical body defining a seat bore axially therethrough and having an outer surface;
    an enlarged diameter portion extending axially from the generally cylindrical body and defining a shoulder surface, the enlarged diameter portion having a sealing surface disposed opposite the shoulder surface that is configured to form a seal with a displaceable portion of a valve; and
    an annular notch formed in the outer surface of the generally cylindrical body and defining a cylindrical surface having an axial length measured from and delimited by the shoulder surface, the annular notch decoupling a stiffness of the enlarged diameter portion to thereby increase a radial compressibility of the generally cylindrical body by a hydraulic fluid injected into an annular channel, the annular channel being formed in one of the cylinder block and the outer surface of the cylindrical body of the at least one valve seat;
    wherein a body length is measured from the shoulder surface to an end of the generally cylindrical body disposed opposite the enlarged diameter portion and a ratio of the axial length to the body length is 0.1-0.4.

12. The reciprocating pump of claim 11 wherein the annular channel is formed in the cylinder block.

13. The reciprocating pump of claim 11 wherein the annular channel is formed in the outer surface of the generally cylindrical body and is disposed axially below the annular notch.

14. The reciprocating pump of claim 11 wherein the ratio of the axial length distance to the body length is approximately 0.25.

15. The reciprocating pump of claim 11 wherein the cylindrical surface defined by the annular notch has a floor diameter, the enlarged diameter portion defines an outer diameter, and the seat bore defines an inner diameter, and wherein a difference between the floor diameter and the outer diameter is approximately equal to a difference between the floor diameter and the inner diameter.

16. The reciprocating pump of claim 11 wherein the cylindrical surface defined by the annular notch has a floor diameter, the outer surface of the generally cylindrical body defines an outer diameter, and the seat bore defines an inner diameter, and wherein a difference between the floor diameter and the outer diameter is approximately equal to a difference between the floor diameter and the inner diameter.

17. A method for ejecting a valve seat of a reciprocating pump, comprising:
    fluidly coupling a source of hydraulic fluid to a quid bore formed in a cylinder block;
    pressurizing the hydraulic fluid in the fluid bore, the hydraulic fluid received by an annular channel and radially compressing the valve seat;
    wherein the valve seat comprises:
        a generally cylindrical body defining a seat bore axially therethrough and having an outer surface;
        an enlarged diameter portion extending axially from the generally cylindrical body and defining a shoulder surface, the enlarged diameter portion having a sealing surface disposed opposite the shoulder surface that is configured to form a seal with a displaceable portion of a valve, and
        an annular notch formed in the outer surface of the generally cylindrical body and defining a cylindrical surface having an axial length measured from and delimited by the shoulder surface, the annular notch decoupling a stiffness of the enlarged diameter portion to thereby increase a radial compressibility of the generally cylindrical body;
    wherein a body length is measured from the shoulder surface to an end of the generally cylindrical body disposed opposite the enlarged diameter portion and a ratio of the axial length to the body length is 0.1-0.4;
    wherein the annular channel is formed in one of the cylinder block and the outer surface of the cylindrical body of the valve seat; and
    removing the valve seat from the cylinder block.

18. The method of claim 17 wherein the annular channel is formed in the outer surface of the generally cylindrical body and is disposed axially below the annular notch.

* * * * *